United States Patent [19]
Niwa et al.

[11] Patent Number: 5,987,460
[45] Date of Patent: Nov. 16, 1999

[54] DOCUMENT RETRIEVAL-ASSISTING METHOD AND SYSTEM FOR THE SAME AND DOCUMENT RETRIEVAL SERVICE USING THE SAME WITH DOCUMENT FREQUENCY AND TERM FREQUENCY

[75] Inventors: Yoshiki Niwa; Hirofumi Sakurai, both of Saitama-ken, Japan

[73] Assignee: Hitachi, Ltd., Tokyo, Japan

[21] Appl. No.: 08/888,017

[22] Filed: Jul. 3, 1997

[30] Foreign Application Priority Data

Jul. 5, 1996 [JP] Japan ................................. 8-176174

[51] Int. Cl.[6] ................................................. G06F 17/30
[52] U.S. Cl. .............................. 707/6; 707/5; 707/4
[58] Field of Search ................................ 707/5, 2, 6, 3, 707/4, 10

[56] References Cited

U.S. PATENT DOCUMENTS

| | | | |
|---|---|---|---|
| 5,265,065 | 11/1993 | Turtle | 707/4 |
| 5,418,948 | 5/1995 | Turtle | 707/4 |
| 5,675,819 | 10/1997 | Schuetze | 704/10 |
| 5,694,594 | 12/1997 | Chang | 707/6 |
| 5,713,016 | 1/1998 | Hill | 707/5 |
| 5,724,567 | 3/1998 | Rose et al. | 707/2 |
| 5,737,734 | 4/1998 | Schultz | 707/5 |
| 5,758,148 | 5/1998 | Lipovski | 707/6 |
| 5,826,260 | 10/1998 | Byrd, Jr. et al. | 707/5 |
| 5,867,799 | 2/1999 | Lang et al. | 707/1 |
| 5,893,092 | 4/1999 | Driscoll | 707/5 |
| 5,915,249 | 6/1999 | Spencer | 707/5 |

OTHER PUBLICATIONS

Proceedings of the 1st ACM International Conference on Digital Libraries Interactive Term Suggestion for Users of Digital Libraries: Using Subject.
Thessauri and Co-Occurence Lists for information Retrieval, Schatz et al. pp. 126–133 Mar. 20, 1996.
Ablex, Article 12, 1990, "Information Retrieval Using Pathfinder Networks", Fowler et al., pp. 165–179.
Proceedings of ACM Sigir '92, "Scatter/Gather: A Cluster-based Approach to Browsing Large Document Collections", Cutting et al, pp. 318–329.

*Primary Examiner*—Thomas G. Black
*Assistant Examiner*—Charles L. Rones
*Attorney, Agent, or Firm*—Fay, Sharpe, Beall, Fagan, Minnich & McKee

[57] ABSTRACT

Because the whole image of a retrieved document group cannot be viewed, next retrieval request after one retrieval attempt has been determined only perceptually. Therefore, displaying a means for displaying topic words on a display means, extracting a group of words characteristically appearing in a retrieved document group on request from a user, further examining the relation between topic words, and preparing a graph using the topic words as nodes, the whole image of the retrieval results is displayed on the means for displaying topic words. Additionally, by selecting an interesting word or a word with no interest on a displayed graph of topic words, the user can design a subsequent retrieval strategy effectively.

24 Claims, 21 Drawing Sheets

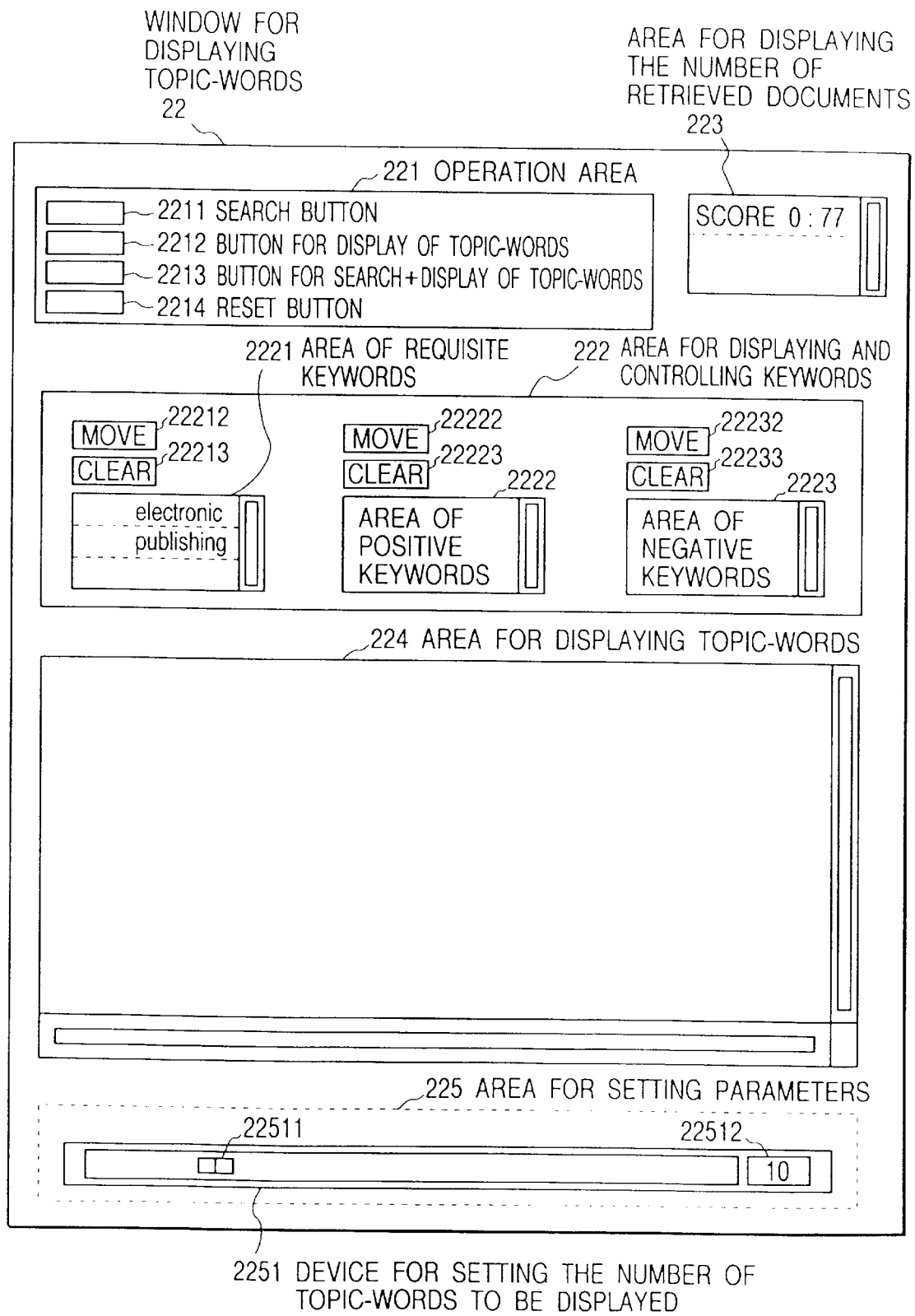

FIG. 7

AREA FOR STORING A GRAPH
543

AREA FOR STORING NODES
5431

| SPELLING | CENTER COORDINATE (x, y) | NUMBER OF CHARACTERS | | SIZE OF DISPLAY AREA | |
|---|---|---|---|---|---|
| | | HORIZONTAL (h) | VERTICAL (v) | HORIZONTAL (H) | VERTICAL (V) |
| compact | (149, 131) | 3 | 2 | 27 | 18 |
| interactive | (149, 131) | 3 | 3 | 27 | 26 |
| ROM | (203, 131) | 3 | 1 | 27 | 10 |
| a publication | (248, 195) | 3 | 1 | 27 | 10 |
| publishing | (248, 256) | 3 | 3 | 27 | 26 |
| electronic | (270, 40) | 2 | 1 | 19 | 10 |
| publishing | (308, 40) | 2 | 1 | 19 | 10 |
| mail | (375, 161) | 3 | 1 | 27 | 10 |
| Nifty Serve | (375, 240) | 3 | 3 | 27 | 26 |
| desk top publishing | (429, 278) | 3 | 5 | 27 | 42 |

AREA FOR STORING LINKS
5432

| COORDINATE OF START POINT | COORDINATE OF END POINT |
|---|---|
| (308, 40) publishing | (270, 40) electronic |
| (203, 131) ROM | (308, 40) publishing |
| (375, 161) mail | (308, 40) publishing |
| (149, 131) compact | (203, 131) ROM |
| (248, 195) a publication | (203, 131) ROM |
| (375, 240) Nifty Serve | (375, 161) mail |
| (149, 240) interactive | (248, 195) a publication |
| (248, 256) publishing | (248, 195) a publication |
| (429, 278) desk top publishing | (248, 195) a publication |

FIG. 9

AREA FOR STORING FREQUENCY DATA 523

| WORD | DOCUMENT FREQUENCY | TOTAL DOCUMENT FREQUENCY | RATIO OF DOCUMENT FREQUENCY | FREQUENCY CLASS |
|---|---|---|---|---|
| ROM | 21 | 1183 | 0.017 | 4 |
| VAN | 6 | 325 | 0.018 | 2 |
| interactive | 5 | 74 | 0.067 | 2 |
| on-line | 13 | 678 | 0.019 | 3 |
| compact | 21 | 978 | 0.021 | 4 |
| disk | 23 | 1741 | 0.013 | 4 |
| desk top publishing | 3 | 4 | 0.750 | 1 |
| Nifty Serve | 5 | 63 | 0.079 | 2 |
| Nifty | 6 | 101 | 0.059 | 2 |
| personal | 5 | 215 | 0.023 | 2 |
| publishing | 4 | 15 | 0.266 | 1 |
| mail | 14 | 524 | 0.026 | 3 |
| media | 41 | 6821 | 0.006 | 5 |
| memory | 20 | 1802 | 0.011 | 4 |
| printed matter | 5 | 160 | 0.031 | 2 |
| retrieval | 15 | 578 | 0.025 | 3 |
| a publication | 9 | 156 | 0.057 | 3 |
| publishing | 77 | 2800 | 0.027 | 5 |
| information retrieval | 3 | 42 | 0.071 | 1 |
| information | 45 | 26799 | 0.001 | 5 |
| electronic | 77 | 4919 | 0.015 | 5 |
| electronic | 4 | 58 | 0.069 | 1 |
| space | 3 | 37 | 0.081 | 1 |
| ⋮ | ⋮ | ⋮ | ⋮ | ⋮ |

FIG. 10

AREA FOR STORING TOPIC-WORDS
524

| WORD | DOCUMENT FREQUENCY | FREQUENCY CLASS |
|---|---|---|
| publishing | 77 | 5 |
| electronic | 77 | 5 |
| compact | 21 | 4 |
| ROM | 21 | 4 |
| a publication | 9 | 3 |
| mail | 14 | 3 |
| Nifty Serve | 5 | 2 |
| interactive | 5 | 2 |
| desk top publishing | 3 | 1 |
| publishing | 4 | 1 |

FIG. 11

AREA FOR STORING CO-OCCURRENCE DATA
— 531

| WORD / DOCUMENT FREQUENCY / WORD | publishing | electronic | ROM | compact | mail | a publication | interactive | Nifty Serve | publishing | desk top publishing |
|---|---|---|---|---|---|---|---|---|---|---|
|  | 77 | 77 | 21 | 21 | 14 | 9 | 5 | 5 | 4 | 3 |
| publishing | — * | — * | — * | — * | — * | — * | — * | — * | — * | — * |
| electronic | 77 1.00 | — * | — * | — * | — * | — * | — * | — * | — * | — * |
| ROM | 21 0.27 | 21 0.27 | — * | — * | — * | — * | — * | — * | — * | — * |
| compact | 21 0.27 | 21 0.27 | 17 0.81 | — * | — * | — * | — * | — * | — * | — * |
| mail | 14 0.18 | 14 0.18 | 1 0.05 | 0 0.00 | — * | — * | — * | — * | — * | — * |
| a publication | 9 0.12 | 9 0.12 | 6 0.29 | 5 0.24 | 1 0.07 | — * | — * | — * | — * | — * |
| interactive | 5 0.06 | 5 0.06 | 2 0.10 | 3 0.14 | 1 0.07 | 2 0.22 | — * | — * | — * | — * |
| Nifty Serve | 5 0.06 | 5 0.06 | 1 0.05 | 1 0.05 | 3 0.21 | 0 0.00 | 0 0.00 | — * | — * | — * |
| publishing | 4 0.05 | 4 0.05 | 0 0.00 | 1 0.05 | 1 0.07 | 2 0.22 | 1 0.20 | 0 0.00 | — * | — * |
| desk top publishing | 3 0.04 | 3 0.04 | 1 0.05 | 0 0.00 | 0 0.00 | 1 0.11 | 0 0.00 | 0 0.00 | 0 0.00 | — * |

FIG. 12

AREA FOR STORING CO-OCCURRENCE LINKS 532

| START POINT | END POINT |
|---|---|
| electronic | empty |
| publishing | electronic |
| ROM | publishing |
| mail | publishing |
| compact | ROM |
| a publication | ROM |
| Nifty Serve | mail |
| interactive | a publication |
| publishing | a publication |
| desk top publishing | a publication |

FIG. 13

GRAPH MAPPING ROUTINE 443

| | |
|---|---|
| ROUTINE FOR CALCULATING Y COORDINATE | 4431 |
| ROUTINE FOR CALCULATING X COORDINATE | 4432 |
| CONVERSION TO REAL SCALE | 4433 |
| ROUTINE FOR SOLVING OVERLAP OF NODES | 4434 |
| MAPPING OF LINKS | 4435 |

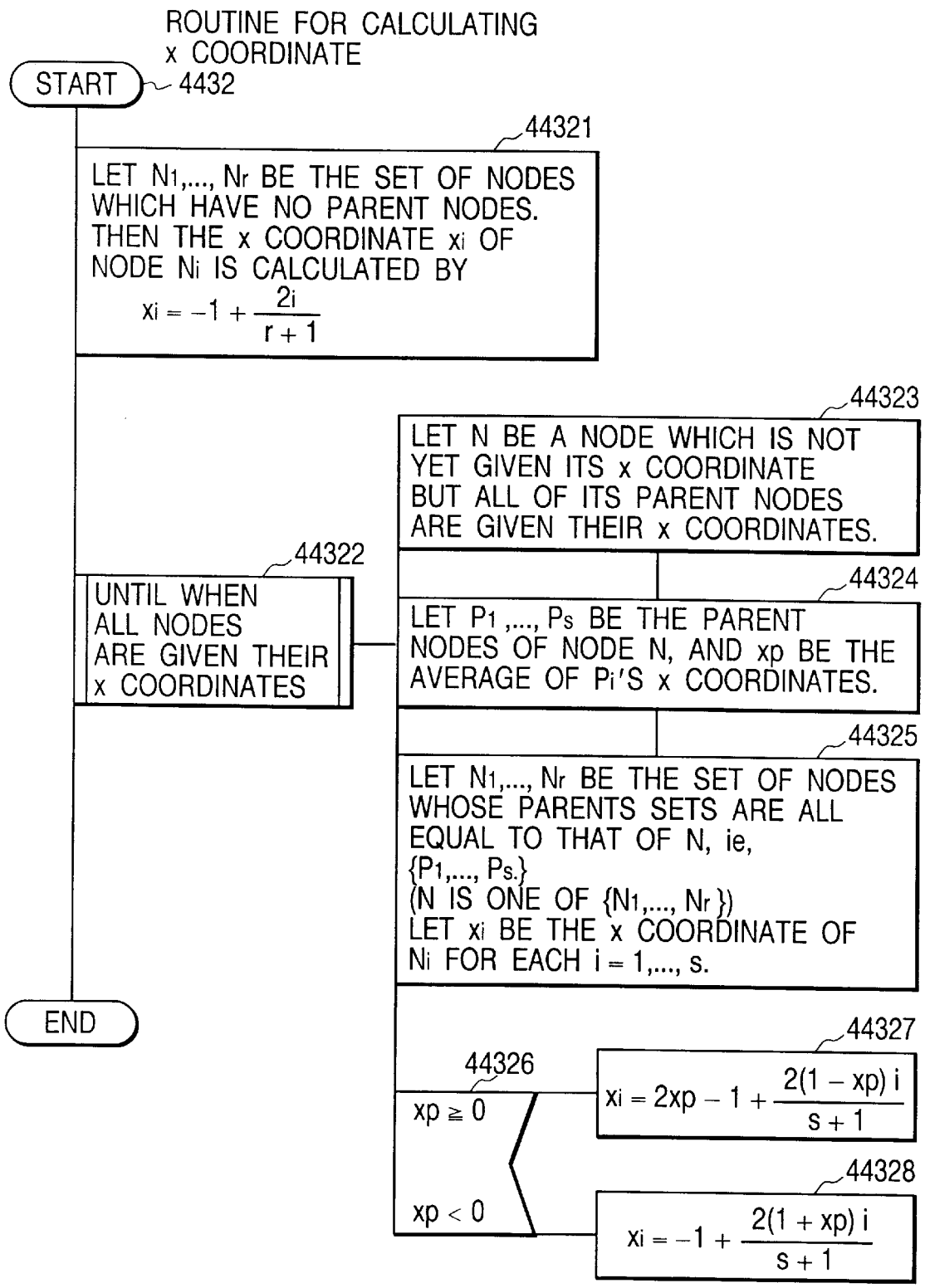

FIG. 15

AREA FOR STORING
NORMALIZED COORDINATE
541

| WORD | X COORDINATE | Y COORDINATE |
|---|---|---|
| electronic | -0.000 | 0.774 |
| publishing | -0.000 | 0.774 |
| ROM | -0.333 | 0.320 |
| mail | 0.333 | 0.168 |
| compact | -0.555 | 0.320 |
| a publication | -0.111 | 0.000 |
| Nifty Serve | 0.333 | -0.223 |
| interactive | -0.555 | -0.223 |
| publishing | -0.111 | -0.307 |
| desk top publishing | 0.333 | -0.413 |

FIG. 16

AREA FOR STORING NODES
5431

| SPELLING | CENTER COORDINATE (x, y) | NUMBER OF CHARACTERS | | SIZE OF DISPLAY AREA | |
|---|---|---|---|---|---|
| | | HORIZONTAL (h) | VERTICAL (v) | HORIZONTAL (H) | VERTICAL (V) |
| compact | (149, 131) | 3 | 2 | 27 | 18 |
| interactive | (149, 240) | 3 | 3 | 27 | 26 |
| ROM | (193, 131) | 3 | 1 | 27 | 10 |
| a publication | (238, 195) | 3 | 1 | 27 | 10 |
| publishing | (238, 256) | 3 | 3 | 27 | 26 |
| electronic | (260, 40) | 2 | 1 | 19 | 10 |
| publishing | (260, 40) | 2 | 1 | 19 | 10 |
| mail | (327, 161) | 3 | 1 | 27 | 10 |
| Nifty Serve | (327, 240) | 3 | 3 | 27 | 26 |
| desk top publishing | (327, 278) | 3 | 5 | 27 | 42 |

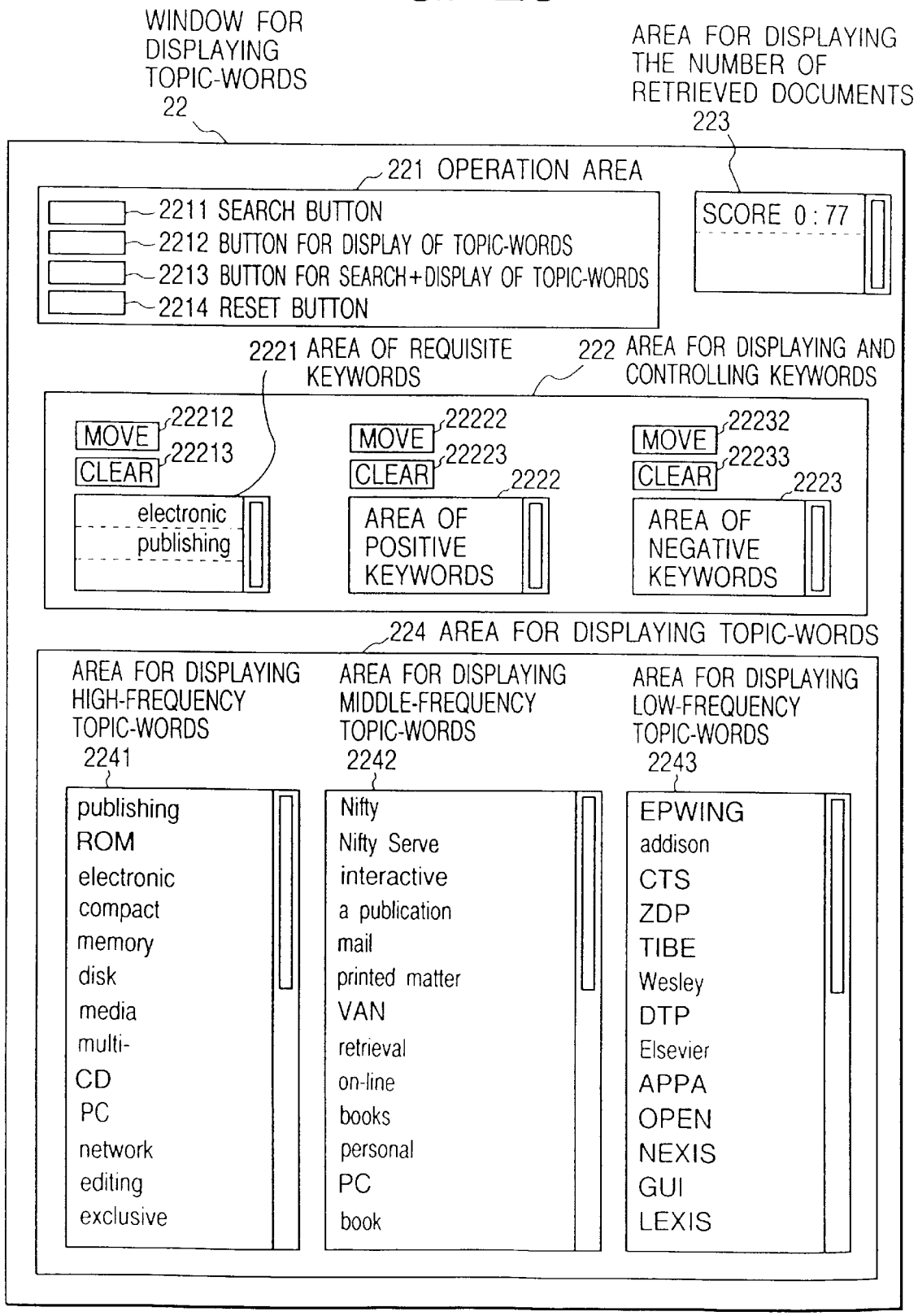

DOCUMENT RETRIEVAL-ASSISTING METHOD AND SYSTEM FOR THE SAME AND DOCUMENT RETRIEVAL SERVICE USING THE SAME WITH DOCUMENT FREQUENCY AND TERM FREQUENCY

BACKGROUND OF THE INVENTION

The present invention relates to a document retrieval-assisting method having a user interface to attain an interactive guidance function for document retrieval and a system for the same and a document retrieval service using the same.

For document retrieval, a variety of interfaces between document retrieval systems and users have been designed and developed, so that these users can readily reach a desired document assembly. Feedback and guidance are primary interfaces among them. Feedback is a mechanism that when a user draws his judgment of YES/NO concerning several items as the results of retrieval, retrieval results reflecting the judgment can then be gained. Further, guidance is a function to provide information with relation to a retrieval operation at the individual processes of the retrieval operation, namely information believed to possibly work as a reference when a user intends to modify or improve the retrieval conditions.

As to the guidance function, conventionally, a method has generally been conducted, comprising proposing information relating to the input retrieval conditions. For example, a method is illustrated, comprising storing a database representing relations between words, such as thesaurus, and retrieving from the data base a set of words with relation to the input word as one retrieval condition. Thesaurus is a tree-structure database primarily showing the is-a relations between words, however, a method is also suggested, comprising automatically generating a data of related words using co-occurrence statistics [see for example B. R. Schatz et al., Interactive term suggestion for users of digital libraries: Using subject thesauri and co-occurrence lists for information retrieval. Proc. ACM DL '96. P.126–133]. A method is additionally proposed, comprising displaying a retrieving word and words with relation to the word in a network structure using the co-occurrence statistic data between words [see for example, R. H. Fowler, D. W. Dearholt, Information Retrieval Using Pathfinder Networks. In Pathfinder Associative Networks, Ablex, article 12, Edited by R. W. Schvaneveldt (1990)].

However, the method providing information with relation to a retrieving condition is disadvantageous in that the method is hardly applicable to a case with a plurality of query words or a case with negation used; and the method is also problematic in that the method is hardly applicable to the document retrieval with no use of any keyword (such as associative search). So as to overcome these problems, a method is proposed, comprising automatically extracting related information from retrieval results and providing the information to a user. For example, Scatter/Gather method [D. Cutting, et al. (1992), Scatter/Gather: A Cluster-based Approach to Browsing Large Document Collections. Proc. ACM SIGIR '92, p. 318–329] automatically classifies a retrieved document group (clustering) and displays the topic words therein per each class. However, real time response is hardly effected in the case of clustering, because the increase of the number of documents escalates the number of calculations by an order of second and third powers; as the progress in retrieval operation, generally, the difference between classes becomes so delicate that the characteristic properties of a class can hardly be hinted from the topic words of the class.

SUMMARY OF THE INVENTION

So as to overcome the aforementioned problems and propose a set of topics contained in a retrieved document group on real time, it is an object of the present invention to display the topic words characteristically appearing in a document group in a graph form or a list form; it is another object of the present invention to provide a document retrieval assisting-method capable of a well balanced extraction of low-frequency words to high-frequency words characteristically appearing in the document group and a system therefor; and it is an additional object of the present invention that a user intending to use the document retrieval system (method) can carry out document retrieval at a remote distance.

In order to display topic groups contained in a retrieved document group on real time, therefore, word groups characteristically appearing in a document group are defined as nodes; when an intense co-occurrence relation is observed between a pair of topic words, namely when the number of documents containing both of the words is very large, the word pair is linked to compose a graph which is displayed, and for graphic representation of the topic words, the document frequency of the topic words is represented on the longitudinal axis so as to identify general words and words with high specificity at glance. As to an example of the display of topic words in a list form, topic words are firstly divided in frequency classes, and words at high document frequencies middle frequencies and low frequencies should be aligned in the separate list boxes.

So as to extract topic words with good balance from words at low frequencies and words at high frequencies, in selecting topic words in a retrieved document group, the topic words are classified by occurrence frequency. Then, from the individual classes, topic words should be extracted in the decreasing order of the ratio of the document frequency in the retrieved document group to the document frequency in the entire document database.

BRIEF DESCRIPTION OF THE DRAWINGS

FIG. 6 is a view depicting one example of the display image when the window for displaying topic words is started, through which a user can provide a topic word as a keyword for searching;

FIG. 7 is a view depicting one example of the data stored in the area for storing a graph of topic words on request of a user to display topic words;

FIG. 9 is a view depicting one example of a word frequency data of the retrieved document group;

FIG. 10 is a view depicting one example of a list of topic words extracted from the retrieved document group;

FIG. 11 is a view depicting one example of a data representing co-occurrence relation between topic words generated from the retrieved document group;

FIG. 12 is a view depicting one example of a list of pairs of topic words with an intense co-occurrence relation in the retrieved document group;

FIG. 13 is a PAD (Problem Analysis Diagram) view depicting one example of the composition of a calculation routine calculating the graphic arrangement of topic words;

FIG. 14 is a PAD view depicting one example of a method for calculating x-coordinate in graphic arrangement;

FIG. 15 is a view depicting one example of the coordinate data in virtually arranging the graphic representation of the retrieval results in a normalized region;

FIG. 16 is a view depicting one example of the coordinate data of a graph for graphic representation of the retrieval results, before the overlapping of the displayed nodes in a graph is solved;

FIG. 20 is a view depicting one example of the display of topic words in list form.

DESCRIPTION OF THE PREFERRED EMBODIMENTS

EMBODIMENT I

The embodiment I of the present invention will now be described below with reference to FIGS. 1 to 20. The present embodiment is one composition example of a retrieval system comprising computers for independent use. In the present embodiment, retrieval results represented in graph form are primarily described.

Figure 1:
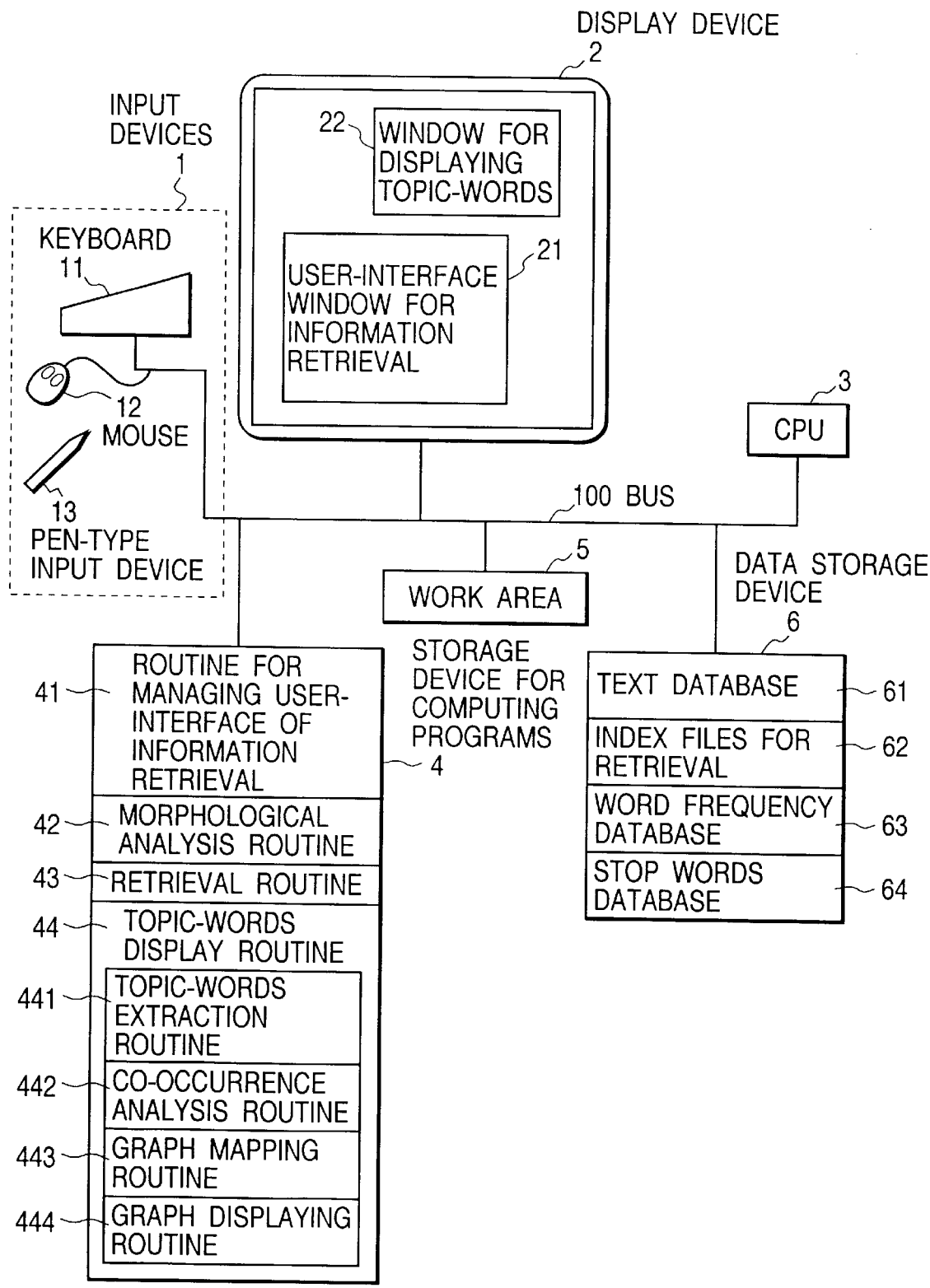
FIG. 1 is a block diagram depicting the composition example of a retrieval system comprising computers for independent use in an embodiment of the present invention.

FIG. 1 shows the overall composition of the document retrieval system of the present embodiment; 1 represents input device; 2 represents display device; 3 represents CPU; 4 represents storage device for computing program; 5 represents work area for operating the computing program; and 6 represents data storage device. These means or devices are in communication by means of bus 100 to exchange signals between them.

The input device 1 comprises keyboard 11, mouse 12 and optical pen-type input device 13. On the display device 2 are displayed user-interface window for information retrieval 21 and window for displaying topic words 22, so as to guide retrieval. The storage device for computing program 4 contains a routine for managing user-interface of information retrieval 41, morphological analysis routine 42, retrieval routine 43 and topic words display routine 44, which are essential for the document retrieval system of the present embodiment. In order to extract and display topic words from a retrieved document group on the window for displaying topic words 22, the topic words display routine 44 uses topic words extracting routine 441, co-occurrence analysis routine 442, graph mapping routine 443 and graph displaying routine 444, as the sub-routines. The detail of the work area 5 is described below with reference to FIG. 2. The data storage device 6 comprises text database 61, index files for retrieval 62, word frequency database 63 and stop word database 64. As these databases, generally, a user selects those satisfying the retrieval object of herself as retrieval data subjects, and then uses them. For example, a user may purchase and use a database issued from a newspaper company when she wants to search newspaper articles. It is needless to say that stop word database 64 may sometimes be offered as an attached data from the supplier of the system.

Figure 2:
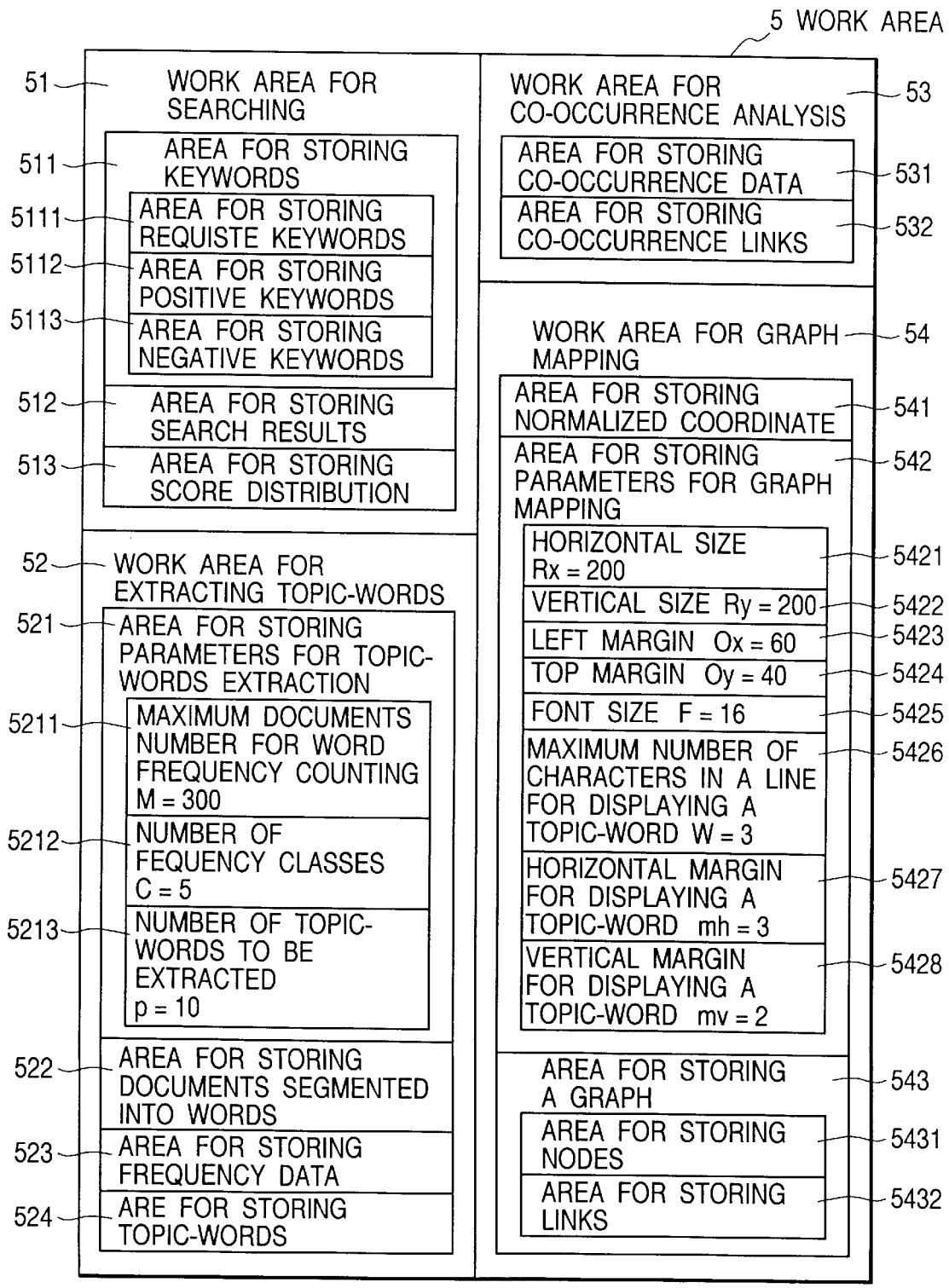
FIG. 2 is a view depicting one arrangement example of assigning data in work areas.

FIG. 2 shows the detail of the composition of the work area 5. The work area 5 is a work area for storing parameters or transient data, required for the operation of various routines at the storage device for computing program 4, and comprises work area for searching 51, work area for extracting topic words 52, work area for co-occurrence analysis 53 and work area for graph mapping 54. The individual areas are equipped with further finely divided data areas, but the detail thereof will be described when the routines individually relating to the areas are started.

When a user wishes document retrieval, the command to start the document retrieval system is input from the keyboard 11. Correspondingly, the routine for managing user-interface of information retrieval 41 is initiated, to display the user-interface window for displaying information retrieval 21 to progress retrieval operations in an interactive manner on the display device 2.

Figure 3:
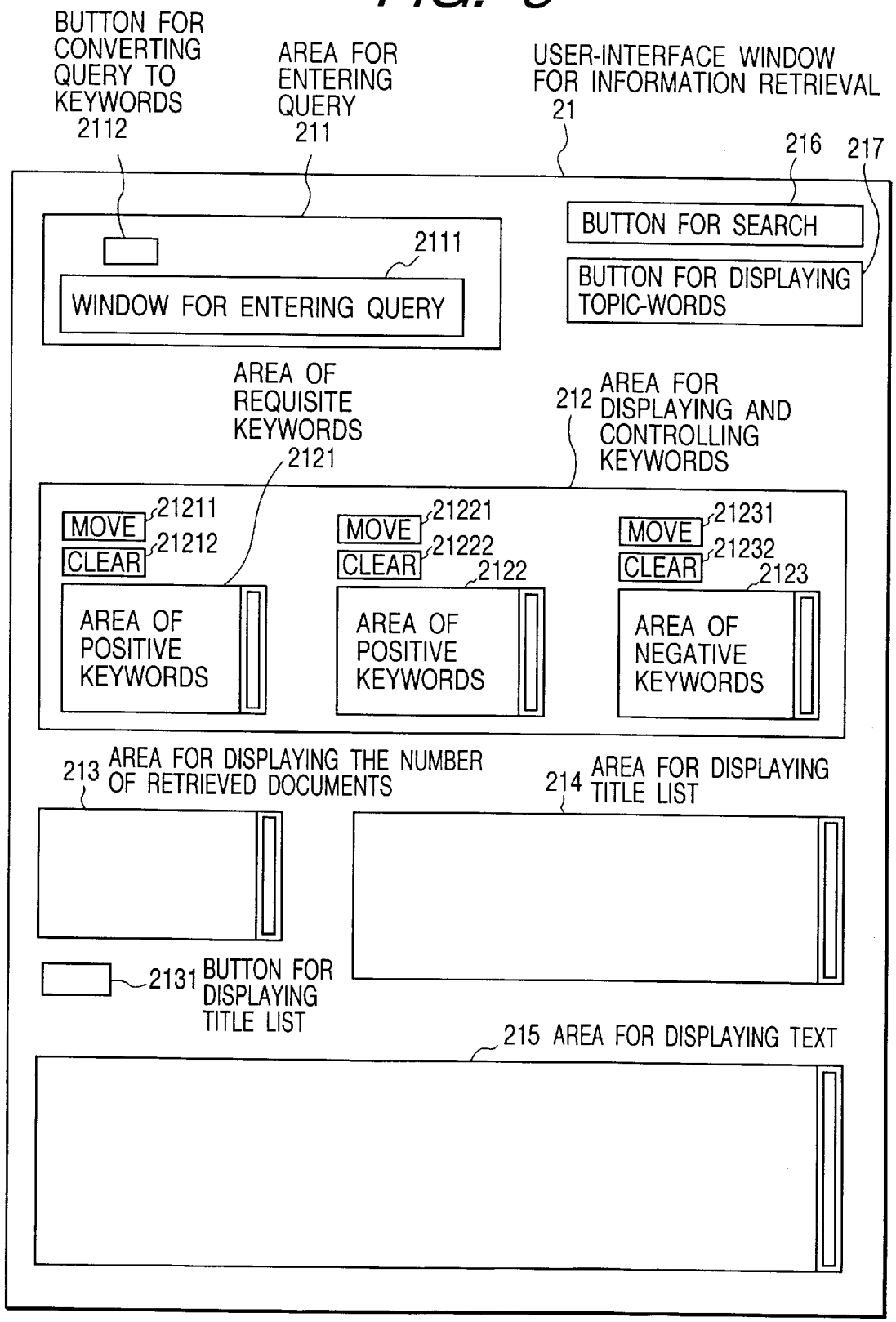
FIG. 3 is a view depicting one example of the display image of the user-interface window for information retrieval.

FIG. 3 is one example of the initial image of the user-interface window for displaying information retrieval 21. The user-interface window for displaying information retrieval 21 comprises area for entering query 211, area for displaying and controlling keywords 212, area for displaying the number of retrieved documents 213, area for displaying title list 214, area for displaying text 215, button for search 216 and button for displaying topic words 217.

In the present embodiment, as the keywords for document retrieval, use is made of three types of keywords, namely requisite keyword, positive keyword, and negative keyword. Retrieval is carried out by AND of requisite keyword(s); when no requisite keyword is given, OR of positive keyword (s)is used. Each document is given a score which is the number of positive keywords contained in the document minus the number of negative keywords contained in the document. Even if an identical keyword appears repeatedly in one document, one point is simply added or subtracted. Corresponding to these three types of keywords, area for displaying and controlling keywords 212 are composed of three parts. The compositions in these three parts are identical, so the left part for requisite keywords are mainly described herein. The part of the requisite keywords on the area for displaying and controlling keywords 212 comprises area of requisite keywords 2121, move button 21211 and clear button 21212. The move button 21211 is used to transfer another type of keywords to the part of requisite keywords, while the clear button 21212 is used to eliminate the keywords from the part of requisite keywords. More specifically, if a keyword displayed on the part of positive keywords or negative keywords is selected and the move button 21211 for requisite keywords is pushed, the selected keyword is transferred to the part of requisite keywords. If a keyword displayed on the part of requisite keywords is selected and the clear button 21212 is pushed, the selected keyword is eliminated from the part of requisite keywords. If a keyword displayed on the part of requisite keywords is selected and the move button 21221 for positive keywords is pushed, the selected keyword is transferred to the part of positive keywords. If a keyword displayed on the part of requisite keywords is selected and the move button 21231 for negative keywords is pushed, the selected keyword is transferred to the part of negative keywords.

As will be described below, additionally, these move buttons can be used as copying buttons to copy the topic words on display of topic words. In other words, the use of the button, namely the use for moving or the use for copying, is determined, depending on where a subject word is located.

For inputting retrieval requirement, window for entering query 2111 of the area for entering query 211 is clicked by mouse 12 to put the area at a state for waiting for an input, and using the keyboard 11, then, the retrieval requirement such as requisite keywords, positive keywords and negative keywords should be input. When pushing the button for converting query to keywords 2112, subsequently, the character row input in the window for entering query 2111 is transferred on morphological analysis routine 42 where the character row is divided in word rows. Then, with reference to the stop word database 64, the words registered therein are eliminated, and the results are stored in the area for storing keywords of default type 5111 or 5112 of the area for storing keywords 511 (FIG. 2). Here we assume the default keyword type is negative. The individual contents are displayed in the form of a list on areas for storing keywords 2121 or 2122. As apparently shown in an example below, in this case, the state of word division is determined on the basis of the dictionary of the morphological analysis routine 42.

Pushing button for search 216, then, retrieval routine 43 is started, and with reference to the index files for retrieval 62 (data linking each word to the set of document representing which document containing the word), documents including all of requisite keywords are retrieved. The row of identification numbers of retrieved documents is stored in area for storing search results 512. The retrieval routine 43 carries out such an operation that one point is added per one positive keyword contained in the document retrieved with the requisite keywords, while one point is subtracted per one negative keyword contained therein. The scores are also stored, together with the document identification numbers, in the area for storing search results 512. With no assignment of any requisite keyword, the retrieval routine 43 carries the retrieval by OR of positive keywords; and in the same manner, the scores are calculated hereinafter. With no requisite keyword or no positive keyword, no retrieval is run even if the button for search 216 is pushed.

Because requisite keywords are processed with AND for retrieval, the keywords are inevitable for more strictly narrowing the search results. When wishing search with retrieval results rather with no leakage, on contrast, the search should be run with OR, using only positive keywords; when an item possibly including an undesirable item in the retrieval results may be assumed, negative keywords should be set.

The retrieval routine 43 furthermore calculates the score distribution on the basis of the retrieval results stored in the area for storing search results 512, and the results are then stored in the area for storing score distribution 513. The term score distribution means a data showing the number of documents with each score of positive points or negative points.

Description will be made of an example wherein retrieval requirement by using "electronic publishing" as a requisite keyword is input.

After inputting the character row of "electronic publishing" as the requisite keyword on the window for entering query 2111, the button for converting query to keywords 2112 is pushed. Through the morphological analysis routine 42, the "electronic publishing" is divided as "electronic/ publishing" and stored in the area for storing requisite keywords 5111 and further displayed as divided on the first line and the second line of the area of requisite keywords 2121.

Figure 4:
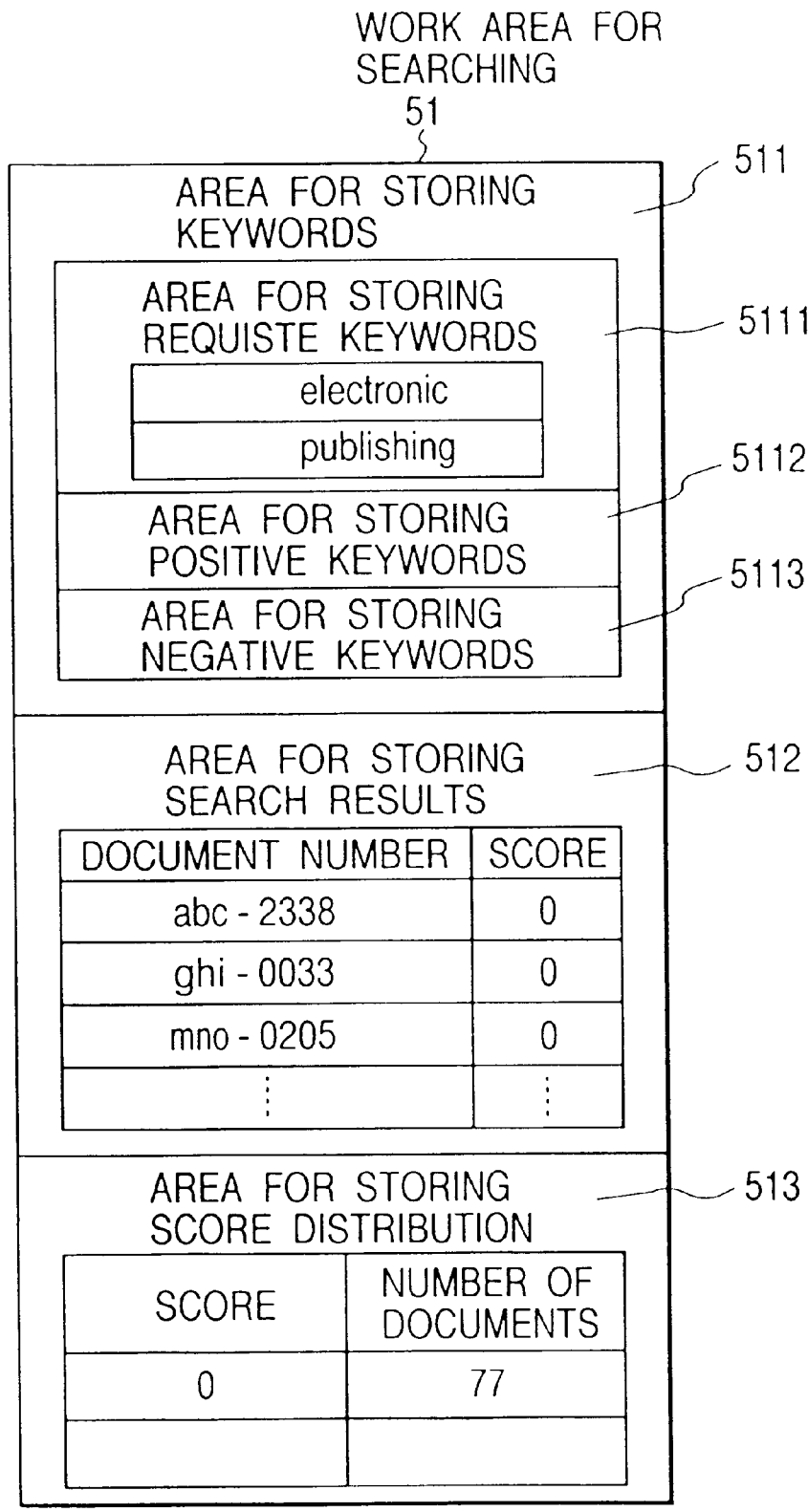
FIG. 4 is a view depicting one example of the data stored in the work area for searching during retrieval operation.

FIG. 4 shows the state of work area for searching 51 when the button for search 216 is pushed at that stage. In the present example, the requisite keywords are "electronic" and "publishing", and therefore, they are stored in the area for storing requisite keywords 5111. Besides them, any positive keyword or negative keyword is never provided by a retriever on the window for entering query 2111, and therefore, the area for storing positive keywords 5112 and the area for storing negative keywords 5113 are left as blank. The retrieved document numbers and the scores are stored in the area for storing search results 512. In this case, because of the absence of positive keywords or negative keywords, all the scores are zero. The data of the number of retrieved documents per each score are stored in the area for storing search results 513. In this case, the score is simply zero, with 77 cases.

Figure 5:
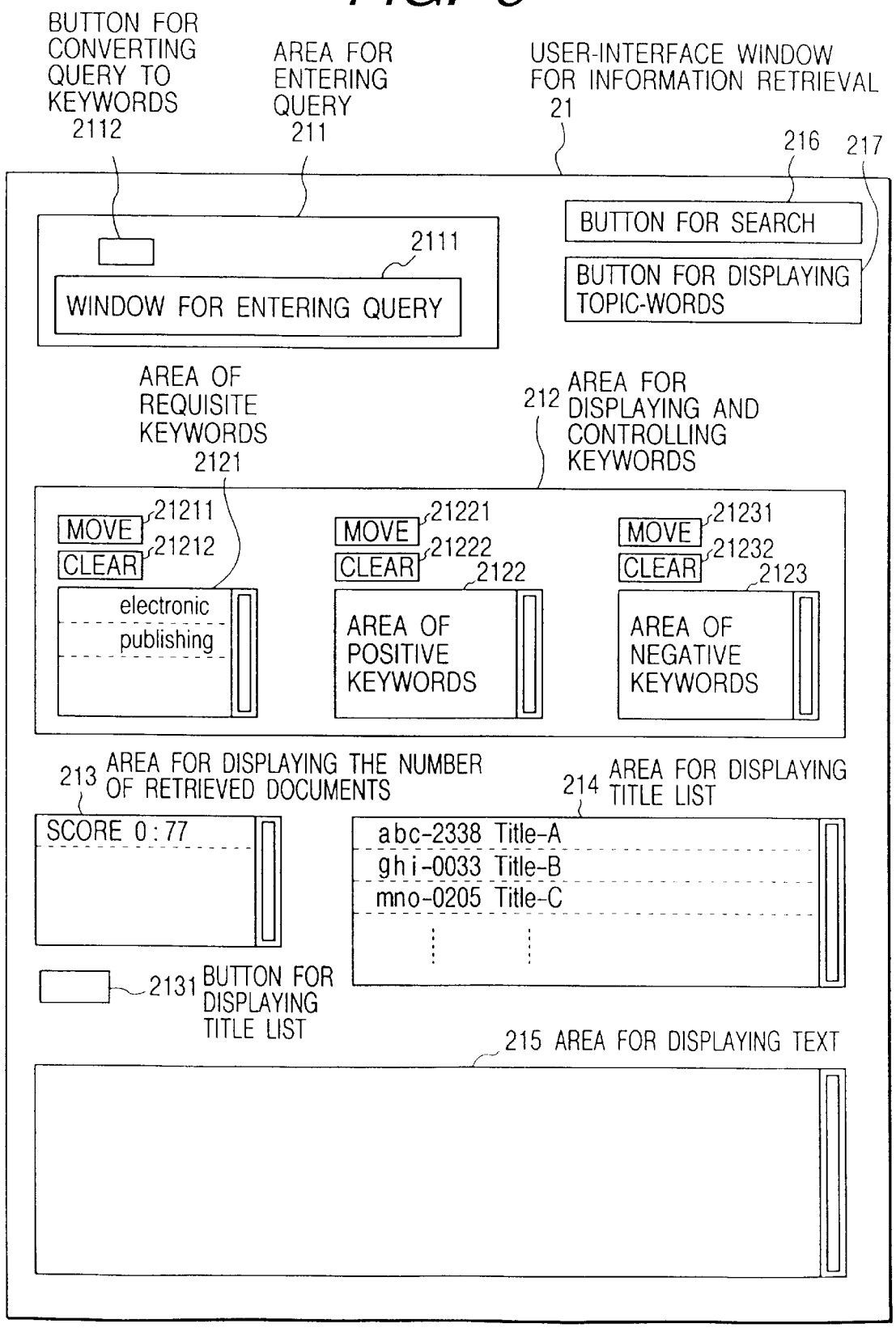
FIG. 5 is a view depicting one example of the retrieval results displayed on the display image of the user-interface window for information retrieval as shown in FIG. 3, after the retrieval operation.

FIG. 5 depicts the state of the user-interface window for information retrieval 21, displaying the search results. The requisite keywords, "electronic" and "publishing", are displayed on the area of requisite keywords 2121; the area for displaying the number of retrieved documents 213 displays the contents of the area for storing score distribution 513; and the area for displaying title list 214 displays an appropriate number of the retrieved document identification numbers and the titles on one line per one case. When the document identification number and the title, not yet displayed, are wanted, the part appearing on the display should be scrolled by means of a so-called scroll bar. If you want to read the contents from any displayed title, the corresponding title is pointed with a mouse and the like, to display a part of the contents on the area for displaying text 215. If you want to know the contents of a document not on display, a part appearing on the display should be scrolled by means of a scroll bar, in the same fashion.

Above all, totally 77 documents are retrieved, which are related to "electronic publishing". Retrieval is sometimes narrowed to a specific subject at next stage; otherwise, an overview of what types of topics may be contained in the 77 documents is wanted. In such case, pushing the button for displaying topic words 217 on the user-interface window for information retrieval 21 (FIG. 3), topic words display routine 44 is started to display window for displaying topic words 22 on the display device 2.

FIG. 6 depicts the detail of a part of the window for displaying topic words 22. The window for displaying topic words 22 is composed of operation area 221, area for displaying and controlling keywords 222, area for displaying the number of retrieved documents 223, area for displaying topic words 224 and area for setting parameters 225. The area for displaying and controlling keywords 222 and the area for displaying the number of retrieved documents 223 are individually in communication with the area for displaying and controlling keywords 212 and the area for displaying the number of retrieved documents 213 of the user-interface window for information retrieval 21, respectively, and when the contents displayed thereon are changed by the operation on the window for displaying topic words 22, the individual displays of the user-interface window for information retrieval 21 automatically change as well. Change in the adverse direction, namely the change of keywords and the number of retrieved documents by the operation on the user-interface window for information retrieval 21, cannot be reflected automatically on the window for displaying topic words 22. So as to incorporate the change, the contents of the side of the user-interface window for information retrieval 21 are copied on the side of the window for displaying topic words 22 when the reset button 2214 on the operation area 221 is pushed. On the initial display of the window for displaying topic words 22 displayed on the display device 2, by pushing the button for displaying topic words 217 on the user-interface window for information retrieval 21, the keywords and the number of retrieved documents on the user-interface window for information retrieval 21 are automatically copied. In the present example, "electronic" and "publishing" are displayed on the area of requisite keywords 2221, while on the area for displaying the number of retrieved documents 223 is displayed "score 0: 77 cases".

Pushing then the button for displaying topic words 2212 of the operation area 221, topic words extraction routine 441 is started, to read the document identification numbers with the maximum score from the data stored in the area for storing search results 512 and then analyze the contents of the documents corresponding to the document identification numbers to display words (topic words) characteristically contained in the documents as well as the results in a graph of the analysis of the relation of the topic words on the area for displaying topic words 224. The process will be described in detail in the following description.

FIG. 7 is an example of "electronic publishing", representing the data stored in area for storing a graph 543 (FIG. 2). The graph is composed of nodes and links, which are stored in area for storing nodes 5431 and area for storing links 5432, respectively. The nodes data to be stored comprises the topic word (character row) represented by each node, the coordinate center of the topic word represented in the area for displaying topic words 224, the character numbers in the crosswise and lengthwise directions of a region displaying the characters, and the size of the displaying region (provided that the size of the displaying region is represented by its half value, namely the size from the center to the ends for ready use). Alternatively, the link data to be stored is composed of the initiation coordinate and the termination coordinate of a line to be represented on a graph. In the figure, in addition to the initiation coordinate and the termination coordinate to be stored in the area for storing links 5432, the data of the character rows corresponding to individual links are shown for reference. But the data are not required for an actual system.

Figure 8:
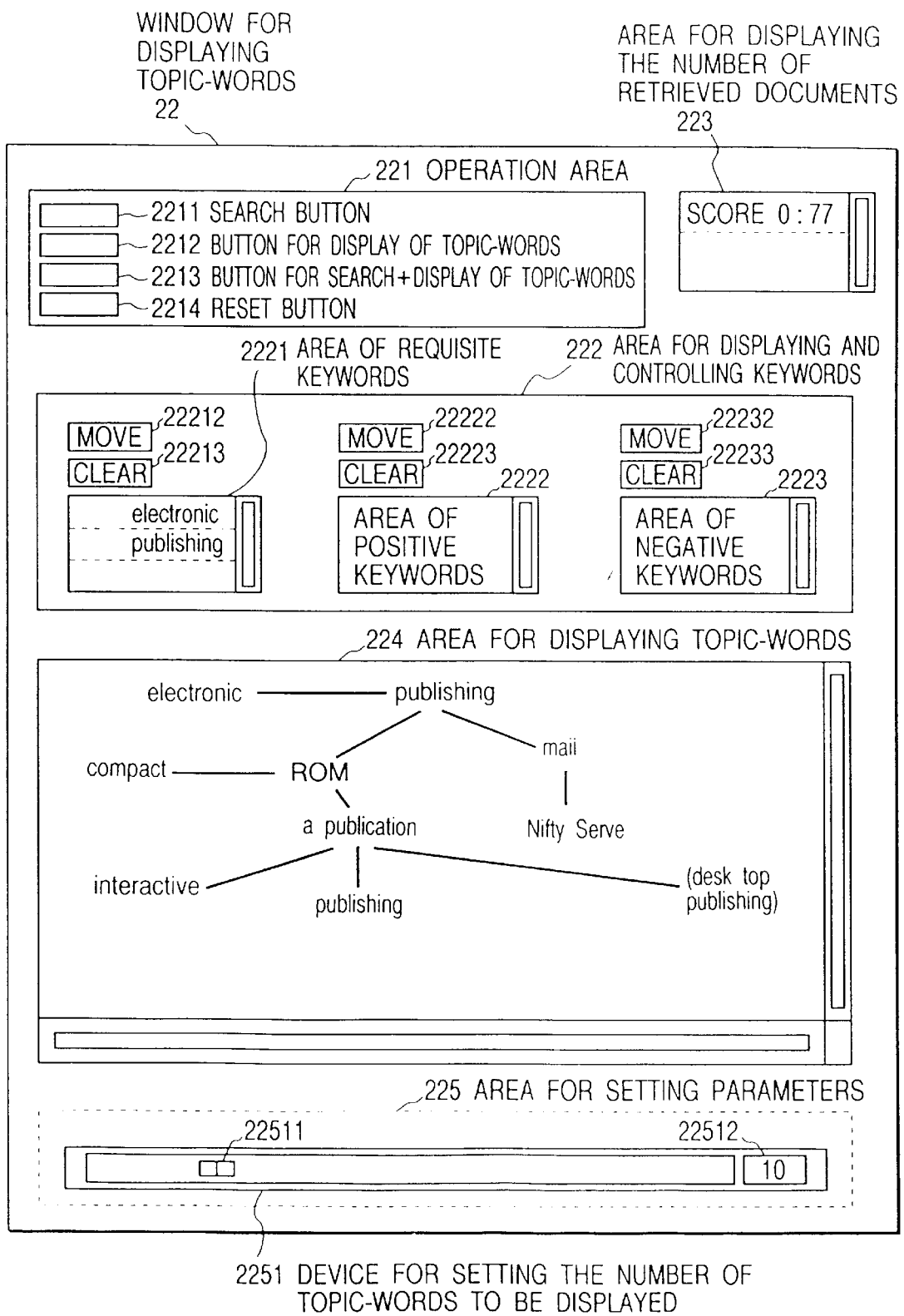
FIG. 8 is a view depicting one example of graphic representation of topic words extracted from the retrieved document group.

FIG. 8 is a view depicting the window for displaying topic words 22 at a state such that a graph of topic words is displayed by pushing the button for displaying topic words 2212 on the operation area 221. Following the data of the area for storing a graph 543, the graph displaying routine 444 represents a graph composed of topic words and links connecting the words, on the area for displaying topic words 224. From the data in FIG. 7, for example, "compact" is displayed on a rectangular display region with the coordinate center present on the coordinate (149, 131) and with the number of characters in the crosswise direction being 3 and the line number being 2, which region is of a size of 27 from the center to both the sides in the crosswise direction and of 18 from the center to the upper and lower sides in the lengthwise direction. In the present example, the crosswise direction is defined as rightward direction and the lengthwise direction is defined as downward direction, provided that the coordinate is defined as the upper left of the area for displaying topic words 224. Additionally, the link data can be defined as the coordinates of the initiation point and the termination point. The first one of the link data means the connection between the coordinate centers of the topic words "publishing" and "electronic", while the second data means the line from the coordinate (203, 131) to the coordinate (308, 40). For representation of these words, an opaque rectangle is displayed on the background for character display in the display region of each node, to hide the line in the node display region, thereby preparing a readily viewable graph. When the graphic line representing a link overlaps with the nodes display region, however, no line appears, which may induce erroneous judgment. In the data in FIG. 7, for example, the graphic line connecting between "desk top publishing" and "a publication" passes through the display region of "Nifty Serve", and therefore, the graphic line does not appear as a line in the region if "Nifty Serve" is displayed on an opaque rectangle background. Consequently, it looks as if "Nifty Serve" and "a publication" were connected together with the graphic line and additionally as if "Nifty Serve" and "desk top publishing" were connected together with the graphic line. As a countermeasure against such phenomenon, in FIG. 8, such a display is adopted that the display of a graphic line is omitted around the initiation point and termination point of the graphic line, instead of the display of an opaque rectangle, so that it is avoided for the graphic line to enter into the nodes display regions, and additionally that the passing of the graphic line is apparently viewable in other display regions. It is very difficult to make arrangement so as to avoid the disappearance of graphic lines in an opaque rectangle if attached, and particularly, if it is intended to display a great number of topic words, a display at a readily viewable size might never been attained eventually.

The device for setting the number of topic words to be displayed 2251 of the area for setting parameters 225 is for adjusting the number of words to be displayed on the area for displaying topic words 224. By sifting the button for setting 22511 to left or right, the device 2251 can be set to a desirable numerical figure. The set value is displayed on display device 22512, and is stored in area for storing the number of topic words to be extracted 5213 of area for storing parameters for topic words extraction 521. The numerical figure is utilized by the topic words extraction routine 441.

The process of preparing a graphic data as shown in FIG. 7, after the button for displaying topic words 2212 of the window for displaying topic words 22 is pushed, will be described below. When the button for displaying topic words 2212 is pushed, the topic words extraction routine 441, co-occurrence analysis routine 442 and graph mapping routine 443, stored in storage device for computing programs 4, are sequentially initiated.

The topic words extraction routine 441 reads the maximum score and the number of retrieved documents from area for storing search distribution 513 of the work area for searching 51. In the example of "electronic" and "publishing", the maximum score (S) is 0, while the number is 77. Then, maximum documents number for word frequency counting (M) 5211 is read out from the area for storing parameters for topic words extraction 521. (Herein, M=300.) Because a longer time is needed to analyze all the documents of which the retrieved document number K is large and if the number K exceeds a given limit for M, samples of the number M should be extracted.

With reference to the area for storing search results 512, the topic words extraction routine 441 reads the contents of all the document identification numbers with the scores agreeing with the maximum score (S) from the text database 61, and using the morphological analysis routine 42, the contents are divided in words to count the number of documents where each of all the words appears (referred to as document frequency hereinbelow). In this example, the number of the retrieved documents with the maximum score is 77 and the maximum documents number for word frequency counting is M=300 or less. Therefore, all the documents are read.

Furthermore, the morphological analysis of a subject document can be run, by storing the results of the morphological analysis of all the documents and reading the results if the database storage means has enough capacity. Because of no need of practicing the morphological analysis per retrieval, then, the analysis time can be markedly shortened effectively.

The data of words and document frequencies thereof, thus recovered, are stored in the area for storing frequency data 523 in the work area for extracting topic words 52. Because the results of the morphological analysis of the subject document as described above are to be used subsequently, the results are stored in the area for storing documents segmented into words 522.

FIG. 9 shows one example of "electronic publishing", wherein a part of the data stored in the area for storing frequency data 523 is shown. Each data is composed of five items, namely the name of a word, the document frequency, the total document frequency, the frequency ratio and the frequency class. The document frequency of a word is the number of retrieved documents where the word appears. Furthermore, the total document frequency is the number of documents using the word in the entire retrieval document subjects, with no relation with the results of retrieval. From the information stored in word frequency database 63 is extracted the frequency information of a subject word. Thus, the word frequency database 63 should be prepared beforehand, by preliminarily scanning the entire documents as retrieval subjects to count all the words appearing in the documents and calculate the total document frequencies of the words. The frequency ratio is a value of the document frequency divided by the total document frequency. For a case of first word ROM, for example, the frequency ratio is 21 divided by 1183 being equal to about 0.017, provided that 21 is the document frequency and 1183 is the total document frequency.

Then, the frequency class is described below. A topic word characteristic to a document group can be determined on the basis of the dimension of the frequency ratio, and a larger frequency ratio means a higher degree of topic properties. However, it is risky to compare two words with significantly different document frequencies from each other. A word with a lower frequency potentially has a higher probability of a larger frequency ratio because such word has a lower total frequency. For example, in FIG. 9, the frequency ratio of "desk top publishing" is 0.75 but the word cannot be defined as a word with greater topic properties due to the larger frequency ratio. This is because the document frequency is only 3, while the total document frequency is also only 4. So as to avoid comparison of words with larger difference in the document frequency, therefore, the document frequency is preliminarily divided broadly at an appropriate interval for classification, and in each class, words with larger frequency ratios can be selected as topic words, whereby topic words can be extracted with good balance from words at a lower frequency to words at a higher frequency.

One example as to how to determine the frequency class is described below. Topic words extraction routine 441 reads number of frequency classes (C) 5212 as a parameter as to how many frequency classes should be used for division, which is determined by a user. Herein, C=5 (generally, C is an integer of 1 or more). Provided that the i-th frequency ratio is C[i], the document frequency required to be classified in the C[i] is defined as f[i] or more to less than f[i+1]. However, the largest class has f[i+1] or less instead of less than f[i+1]. It will be described then how to determine the value of f[i] as the frequency threshold value. Herein, provided that K' is the subject document number, f[i]=K' in the order of (i/(C+1)) power. (When the number of the retrieved documents does not exceeds the maximum documents number for word frequency counting M, K'=K; if K>M, K'=M.) In this example, K'=77 and C=5, and therefore, f[1]=77 in the order of (⅙) power=2.06, f[2]= 4.25, f[3]=8.77, f[4]=18.10, and f[5]=37.33. Thus, class 1 is defined as a class of words with a document frequency of 3 or more to 4 or less; class 2, of 5 or more to 8 or less; class 3, of 9 or more to 18 or less; class 4, of 19 or more to 37 or less; and class 5, of 38 or more to 77 or less.

According to the classification provisions, the frequency class of a word can be determined on the basis of the document frequency of the word. In the case of ROM, the document frequency is 21, so the word is classified in class 4; additionally, "interactive" has a document frequency of 5, and is therefore classified in class 2. If the document frequency is smaller than that for class 1 (in this case, the document frequency is 2 or less), the word is removed from the topic words extraction subjects.

The frequency class can be directly calculated by the following formula and is then given to a word. But if the value is equal to C, 1 is subtracted from the value.

Frequency class=[a maximum integer not above $$\{\log(\text{document frequency}) \circ \log K' \times (C+1)\}]-1.$$

Subsequently, the topic words extraction routine reads number of topic words to be extracted (p) 5213 and extracts topic words of the number in total, sequentially from those ranked in the decreasing order of the frequency ratio in each frequency class. As one example of the method for running the extraction, a method is illustrated, comprising extracting topic words of the number (n+1) from the classes with a frequency class of 1 or more to r or less and extracting topic words of the number n from the classes with a frequency class of r or more, provided that the number of extracted words p divided by the number of division of frequency classes C is the quotient n with the remainder r.

The example shown in FIG. 9 is described, provided that the number of extraction p is 10. Because the number of division C is 5, the quotient n of p divided by C is 2 with the remainder r being 0. Thus, two topic words are uniformly extracted from each of the classes 1 to 5. From the data in the area for storing frequency data 523, two topic words are extracted sequentially in the decreasing order of the frequency ratio from each of the individual frequency classes. If the words in the class 5 are to be aligned in the decreasing order of the frequency ratio from the data of FIG. 9, the row of "publishing" (0.027), "electronic" (0.015), "media" (0.006), and "information" (0.001) is produced. Thus, the two topic words at the upper rank, namely "publishing" and "electronic", can be extracted. In the same manner, hereinbelow, ROM and "compact" are extracted as the topic words from the class 4; "mail" and "a publication", from the class 3; "interactive" and "Nifty Serve", from the class 2; and "desk top publishing" and "publishing", from the class 1. These are stored in the area for storing topic words 524.

FIG. 10 shows examples of the data stored in the area for storing topic words 524. Topic words extracted by the above process are stored, together with their document frequencies. In the figure, the frequency classes are also shown for reference, but they can be omitted satisfactorily.

By the above process, the topic words extraction routine 441 is passed through. Continuously, co-occurrence analysis routine 442 analyzes the co-occurrence relation between topic words, and the results are stored in the area for storing co-occurrence data 531.

The area for storing co-occurrence data 531 is of a two-dimensional alignment, containing in its lengthwise and crosswise directions the topic words assembly stored in the area for storing topic words 524. The individual elements represent the number of documents in which a corresponding word pair appears commonly. The co-occurrence analysis routine 442 reads the retrieved document group segmented in words, from the area for storing documents segmented into words 522, and increments an element in the area for storing co-occurrence data 531 for all pairs of topic words co-occurring in each document.

Then, the co-occurrence analysis routine 442 calculates the co-occurrence intensity of each pair of topic words. The co-occurrence intensity is a value of the co-occurrence frequency, which is firstly counted by the above procedure and then divided by the document frequency as the latter word of a word pair (corresponding to the word in the row, in the table). As the document frequency of word, the value stored in the area for storing topic words 524 is used (FIG. 10).

FIG. 11 represents the data stored in the area for storing co-occurrence data 531 at this stage. Each grid is composed of two numerical figures, wherein the upper figure shows the co-occurrence frequency of a corresponding word pair, while the lower figure shows the co-occurrence intensity of the word pair (co-occurrence frequency divided by document frequency of a word on the side of row). For example, the numerical FIG. 6 on the upper part of the grid on line 6 and row 3 means that the topic word "a publication" on line 6 and the topic word ROM at row 3 occur concurrently in 6 documents. In this case, because the document frequency of the topic word of the word pair on the row side, namely ROM, is 21, the numerical figure of the co-occurrence intensity on the lower part is about 0.29 as the value of 6 divided by 21. In the area for storing co-occurrence data 531, the topic words are arranged in the decreasing order of document frequency. Because the lower half of the table below the diagonal line is used in the subsequent process, the remaining part is omitted herein.

Continuously, the co-occurrence analysis routine 442 extracts word pairs with larger co-occurrence intensities (pairs to be linked together on the graph of topic words), from the co-occurrence data. In the present example, each topic word X is to be linked to a topic word with the maximum value of the co-occurrence intensity with X, among words with higher document frequencies than X. The co-occurrence analysis routine 442 collects word pairs to be linked together according to this standard, which are then stored in the area for storing co-occurrence links 532.

When a word with the second largest co-occurrence intensity or the third largest co-occurrence intensity does not have such a markedly small co-occurrence intensity, compared with the word with the maximum co-occurrence intensity (for example, a word with an intensity 0.9-fold or more the maximum intensity), linking to the word is also powerful.

FIG. 12 is a view depicting the contents of the area for storing co-occurrence links 532 at its stage. The process of extracting these links is described with reference to the example of FIG. 11. As to the word "publishing" in the second line in FIG. 12, a single word with a larger document frequency than the frequency of "publishing" is "electronic", and therefore, "publishing" is linked to "electronic". As to the word ROM on the third line, then, two words of "publishing" and "electronic" have higher frequencies than the frequency of ROM, and the co-occurrence intensities thereof with ROM are both 0.27. In this case, linking is effected to "publishing" with a smaller number in the area for storing co-occurrence data 531. Then, the fourth word "compact" is examined. The co-occurrence intensity of the word "compact" with the third word ROM is the largest and is 0.81. Thus, from "compact", linking is effected to ROM. The same procedures are continued below, to recover a link data as shown in FIG. 12.

By the above procedures, the co-occurrence analysis routine 442 is passed through to initiate graph displaying routine 443. Based on the data in the area for storing topic words 524 (FIG. 10) and the data in the area for storing co-occurrence links 532 (FIG. 12), the procedure to arrange a graph of topic words on a two-dimensional plane is conducted.

FIG. 13 shows the detail of the graph mapping routine 443. The graph mapping routine 443 is composed of routine for calculating y coordinate 4431, routine for calculating x coordinate 4432, routine for converting these coordinates into display coordinate 4433, routine for solving overlap of nodes 4434 and link mapping routine 4435, and these are initiated in this order.

On the assumption that the display region is a square display region of [−1, 1][−1, 1], routine for calculating y coordinate 4431 and the routine for calculating x coordinate 4432 calculate coordinates to map individual nodes. The coordinates are called normalized coordinates. The calculated coordinates data is stored in the area for storing normalized coordinate 541.

Firstly, the routine for calculating y coordinate 4431 is initiated. According to the calculation formula $y=(6/\pi)\times \arctan[0.2\times\log(f/fm)]$, a normalized y coordinate of a position to display each topic word is calculated on the basis of the document frequency thereof. That is, a topic word with a larger document frequency is arranged on an upper part on the y coordinate. Herein, fm represents the frequency of a topic word located in the center of topic words aligned in the decreasing order of document frequency [under the provision that the topic word to be selected is located at (the number of total topic words divided by 2)+1, if the number is even]. In the example, the document frequency of "electronic" "publishing" is 77 and is located at the uppermost part, while the document frequency of "publication" is 9 and is located in the center position. $\pi$ means the ratio of the circumference of a circle to its diameter; logarithm log means natural logarithm; arctan means the reciprocal function of tangent function; angle is represented in unit radian. For example, the frequency of "compact" is 21 and therefore, its normalized y coordinate is about 0.32 by the formula $(6/\pi) \times$ arctan $(0.2 \times \log(21 \div 9))$. Normalized y coordinates of other topic words are calculated in the same manner.

Then, the routine for calculating x coordinate 4432 is initiated to calculate a normalized x coordinate of a position to display each topic word.

FIG. 14 is a view depicting the detail of the routine for calculating x coordinate 4432. Firstly, nodes never having parent nodes (linking nodes) are collected by step 44321. In this case, only the node of "electronic" is such node. Thus, the value of the x coordinate is calculated by the formula $xi=-1+2i/(r+1)$ in the step 44321, provided that i=1, as follows; $-1+(2\times1)/(1+1)=0$.

Then, enter loop 44322. At step 44323, a node linked to the node with the defined x coordinate (in this case, "electronic") is singly selected. From the data of co-occurrence links (FIG. 12), herein, it is indicated that "publishing" satisfies the conditions.

Continuously, enter step 44324. Determining the assembly of parent nodes of the node selected at the step 44323, the average of the x coordinates thereof is calculated. The assembly of the parent nodes of "publishing" is {"electronic"}, and the average of the x coordinates is 0.

Then at step 44325, nodes of which the assembly of the parent nodes agrees with {"electronic"} are collected. Herein, such node is singly "publishing".

Continuously, enter branched step 44326. Because the average of the x coordinates of the parent nodes is 0, step 44327 is selected to calculate the x coordinate of "publishing". Inserting s=1, xp=0 and i=1 in the calculation formula of the step 44327, the x coordinate of "publishing" is calculated as 0.

By the above procedures, the normalized x coordinates of "electronic" and "publishing" are determined. Because the x coordinates of all the nodes are not yet determined, loop 44322 is repeated. Among the nodes with still undermined x coordinates at the step 44323, one of nodes without any link except those to "electronic" and "publishing" is selected. In this case, ROM satisfies the conditions.

At step 44324, an assembly of those to which ROM is linked is determined, to give {"publishing"}. Additionally, the average xp of the x coordinates of the parent node {"publishing"} is calculated as 0.

At step 44325, nodes which are linked to the assembly corresponding to {"publishing"} are to be collected. Other than ROM, "mail" satisfies the conditions. Because the average xp of the x coordinates of the parent nodes is 0, the upper branch 44326 is selected. At step 44327, the x coordinates of ROM and "mail" are individually calculated as −0.33, and 0.33, by equally dividing [−1, 1] by three. By the same manner, nodes being linked to only the nodes with determined x coordinates and having the common linking assembly are collected, and then, their x coordinates are determined in order that the nodes are uniformly arranged within the interval (−1, 1] while the average of the x coordinates of the parents is in the center.

FIG. 15 is an example of "electronic publishing", representing the coordinate data stored in area for storing the normalized coordinate 541 at this stage.

Continuously, the graph mapping routine 443 starts the routine for conversion into display coordinates 4433, whereby the coordinates normalized in the region [−1, 1]'[−1, 1] are converted into coordinates representing the practical position on the area for displaying topic words 224 and are then stored in the center coordinate column of the area for storing nodes 5431 (FIG. 16). Conversion is carried out by the following primary formula.

$$X=R_x \times (1+x)+O_x, Y=R_y \times (ym-y)+O_y.$$

Herein, x and y in small characters are normalized coordinates, while X and Y in large characters are the coordinates on the area for displaying topic words 224. ym represents the maximum value of y. In the example of FIG. 15, ym=0.774. As coefficients $R_x$, $R_y$, $O_x$ and $O_y$, values stored in the subject area of the area for storing parameters for graph mapping 542 (FIG. 2) are used, respectively. In the present example, $R_x=200$, $R_y=200$, $O_x=60$ and $O_y=40$.

For the case of "compact", the normalized coordinates by the primary conversion are (−0.555, 0.320), and calculation is conducted as follows;

$$X=200\times(1-0.555)+60=149$$

$$Y=200\times(0.774-0.320)+40=131$$

By such manner, the actual coordinates of all the nodes on the area for displaying topic words 224 are calculated and stored in the area for storing nodes 5431 (FIG. 16). As the preparation for the next step, then, words are aligned in the increasing order of x coordinates. Calculating the number of characters h in the cross wise direction and line number v and calculating the crosswise size H and lengthwise size V of the word display region, these values are stored in the area for storing nodes 5431.

The size of the word display region is calculated by the following formula. Characters should be written in the crosswise direction, with the crosswise size limit of words being defined as W. As the value of W, a value stored in the maximum number of characters in a line for displaying a topic word 5426 is used. Herein, W=3. When the number of characters to be displayed is M, the number of characters in the crosswise direction h and the line number v are M and 1, respectively, under the provision of M≦W. If M>W, h equals to W, while v is the minimum integer above the value of M divided by W. As to "electronic", for example, the number of characters is 2 below W=3 as the crosswise width limit, therefor the line number v=1 and the cross wise size h=2. Next, as to "interactive", the number of characters is 8, which is over W=3, the line number v is the minimum integer above 8/3, namely 3, with the crosswise width h being equal to W=3. Furthermore, half size H of the crosswise size and half size W of the lengthwise size are individually calculated from the number of characters h and v, respectively, by the following formula. The reason why such half size values are set resides in that the half size values are primarily used at the following processes.

$$H=h \times F/2+m_x,$$

$$V=v \times F/2+m_y.$$

Herein, F represents the size of character font; $m_x$ represents the dimension of the margin along the x direction; and $m_y$ represents the dimension of the margin along the y direction. So as to avoid too close alignment of two nodes, $m_x$ and $m_y$ represent the essentially minimum interval between two nodes. As the F, $m_x$ and $m_y$, values stored in the font size 5425, and horizontal margin for displaying topic words 5427 and vertical margin for displaying topic words 5428 (FIG. 2), respectively, are used. In the present example, F=16, $m_x=3$ and $m_y=2$. For example, in the case of "compact", h=3 and v=2, and therefore, the following calculation is done.

$$H=3\times 16/2+3=27$$

$$V=2\times 16/2+2=18$$

The number of characters and the size of display area in the area for storing nodes 5431 are thus calculated.

By such manner, coordinates on the area for displaying topic words are determined, but at this stage, a possibility of nodes overlapping remains. In the example of FIG. 16, for example, the coordinate of "electronic" are the same as that of "publishing", and therefore, they are overlapped to each other. Thus, routine for solving overlap of nodes 4434 is started, to run the procedure to sift the coordinates so as to solve overlapping.

Figure 17:
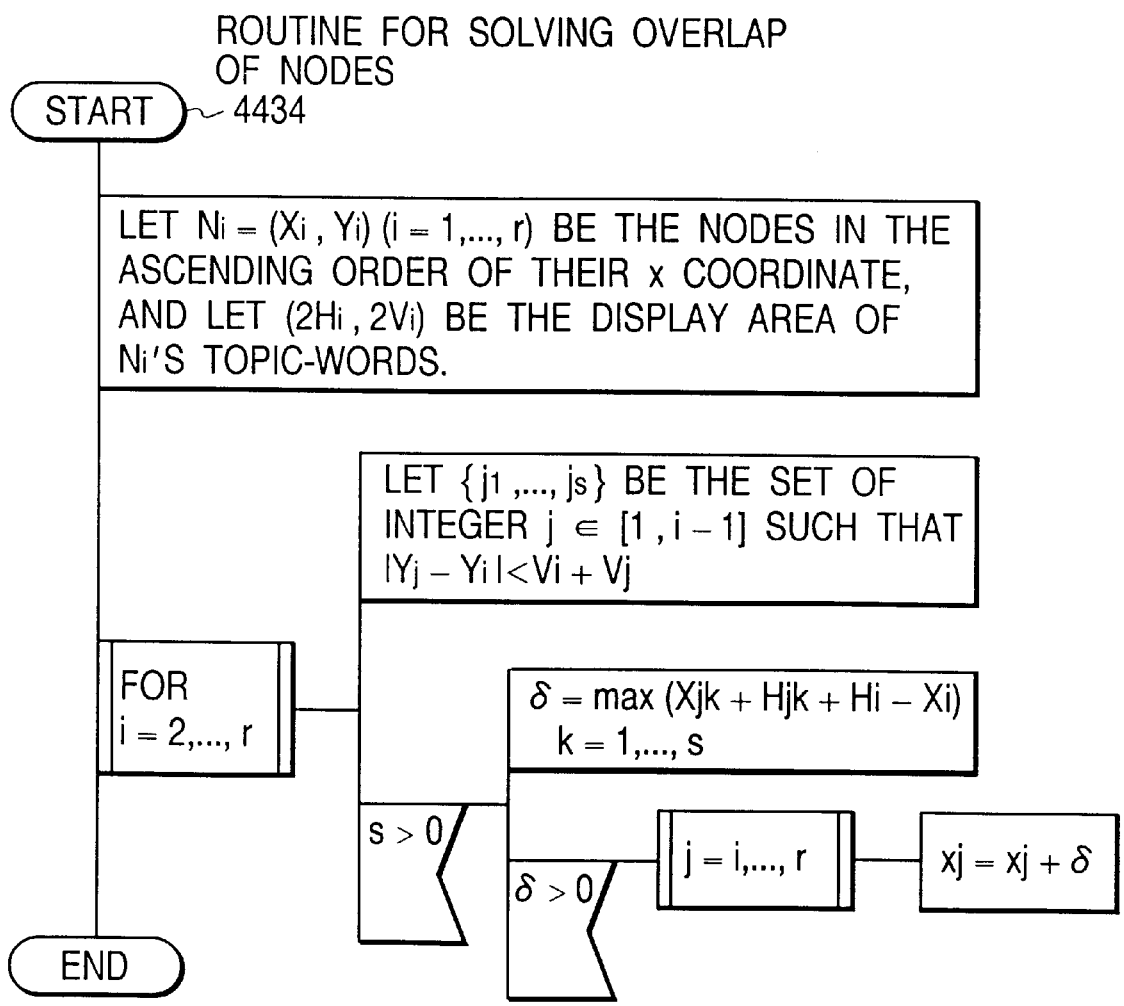
FIG. 17 is a PAD view depicting one example of the detail of the routine to solve the overlapping of displayed nodes in a graph.

FIG. 17 shows the detail of the routine for solving overlap of nodes 4434.

All nodes are sorted in the increasing order of the x coordinates, which are defined as N[1], . . . , N[r]. The coordinate of N[i] is defined as (X[i], Y[i]), while the value of the character display region size is (H[i], V[i]). The following procedures are done provided that i=2, . . . , r. As to j in [1 i−1] satisfying $|Y[j]-Y(i)|<V[i]+V[j]$, the maximum value of X[j]+H[j] is defined as $\epsilon$. When no such j is found, the procedure to sift the coordinate concerning this i is not necessary. $\delta=\epsilon-(X[i]-H[i])$. If $\delta\leq 0$, the procedure to sift the coordinate as to i is not necessary. If $\delta>0$, overlapping occurs and therefore, all of the x coordinates of N[i] . . . , N[r] are sift by d to right. In other words, $$X[k]=X[k]+d\ (k=i,\ldots,r)$$

By the above process, coordinates to display all nodes without overlap can be given.

As to "interactive" at i=2, the data of FIG. 16 shows that $$|Y[2]-Y[1]|=|240-131|=109,\ V[2]+V[1]=26+18=44.$$

Therefore, the formula $|Y[2]-Y[1]|<V[2]+V[1]$ cannot be established. Thus, no procedure for horizontal sifting is run as to "interactive".

Then, the case of i=3, namely ROM, is examined. If j=1, $|Y[3]-Y[1]|=|131-131|=0$, V[3]+V[1]=10+18=28. Then, $|Y[3]-Y[1]|<V[1]+V[3]$. That is, overlapping with "compact" at j=1 occurs. As to the relation with "interactive" at j=2, $|Y[3]-Y[2]|=|131-240|=109$, V[3]+V[2]=10+26=36. Therefore; $|Y[2]-Y[3]|<|V[2]+V[3]$ is not established. Thus, no possibility of overlapping with "interactive" occurs. Therefore, only the case with j=1 should be considered about the x coordinate. $\epsilon=X[1]+H[1]=/149+27=176$. Hence, the sift width $d=\epsilon-(X[i]-H[i])=176-(193-27)=10$. Thus, X[j] is absolutely +10 for any j from 3 to 10. Thus, (X[3], Y[3])= (203, 131). Hence, the coordinate of ROM can be produced as shown in FIG. 7. By repeating the same procedures thereafter, the same data as in the area for storing nodes 5441 as shown in FIG. 7 can be recovered. By the procedure to solve the overlapping of the character display region, the overlapping of the character display region with the graphic line cannot be checked. As an actual problem, if it is intended to strictly solve the overlapping in the limited display area, display in an appropriate size may sometimes be impossible. Therefore in the present embodiment, it is intended to conduct no check about this.

Finally, the graph mapping routine 443 starts link mapping routine 4435. The link mapping routine 4435 stores the information about a word pair to be linked with co-occurrence, which is stored in the area for storing co-occurrence links 532 in the work area for co-occurrence analysis 53, and the routine 4435 prepares a line data, namely the coordinates of an initiation point and a termination point, to be displayed on the area for displaying topic words 224 on the basis of the coordinate data of each node stored in the area for storing nodes 5431 and then stores the line data in the area for storing links 5422. For example, a link from ROM to "publishing" is present in the area for storing co-occurrence links 532 of FIG. 12. From the data stored in the area for storing nodes 5431 of FIG. 7, it is apparently shown that the coordinate of ROM is (203, 131) and the coordinate of "publishing" is (308, 40). The data of a line from the initiation point of (203, 131) to the termination point of (308, 40) is stored in the area for storing links 5432. Thus, the data of a graph to be displayed is prepared (FIG. 7).

An example of the applicable embodiment to progress a search operation with reference to the graphic display of topic words displayed on the area for displaying topic words 224 of the window for displaying topic words 22 will be described hereinbelow.

FIG. 8 is an example of topic word display regarding "electronic publishing", and herein, a user is virtually interested in one of displayed words, for example "desk top publishing". In this case, pointing the position of the word on display by means of mouse 12 and then pointing the move button 22222 for positive keywords, "desk top publishing" is stored in the area for storing positive keywords 5112, which is then displayed on the area of positive keywords 2122 of the user-interface window for information retrieval 21 and the area for positive keywords 2222 of the window for displaying topic words 22. Subsequently, pushing the button for search 216 of the user-interface window for displaying topic words 21 or search button 2211 of the window for displaying topic words 22, search is run while adding "desk top publishing" to the positive keywords, to narrow the search.

Figure 18:
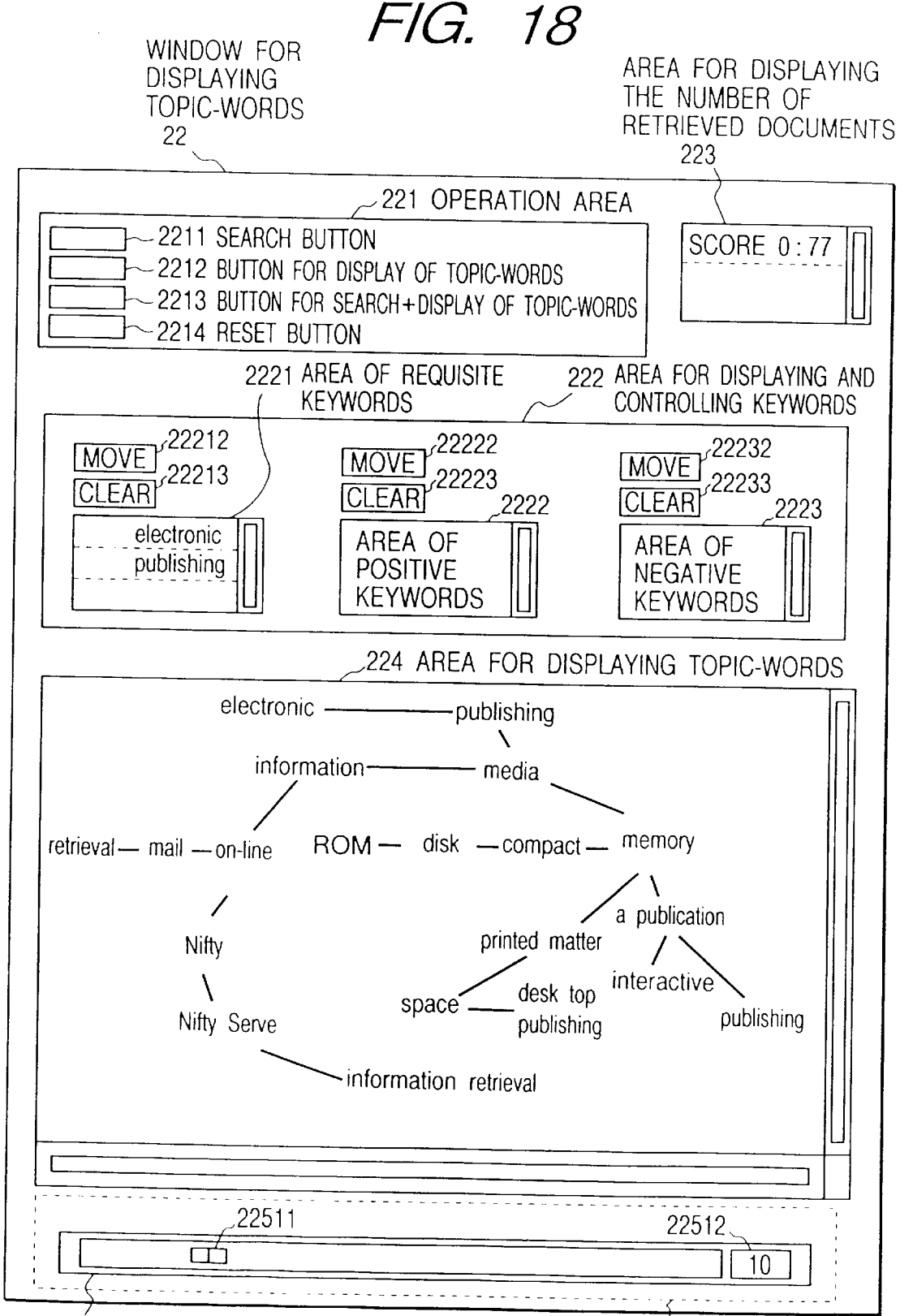
FIG. 18 is a view depicting one example of graphic representation of topic words, when the number of displaying topic words is set at 20.

When no interesting word is found among the topic words displayed on the area for displaying topic words 224 of FIG. 8, the number of displayed words can be increased by using device for setting the number of topic words to be displayed 2251. FIG. 18 is an example wherein the number of displayed topic words is increased to 20. In this case, 20 words are selected from the data of FIG. 9, for example, by topic word extraction routine 441, and in the same manner as described in FIG. 8, these words are displayed. Herein, if a user is virtually interested in "information retrieval" in the field of electronic publishing, for example, the user can utilize the "retrieval" and "information retrieval" displayed on the displayed graph. Clicking "retrieval" and "information retrieval" on the area for displaying topic words by means of mouse and pushing move button 22222 toward positive keywords, these words are added as positive keywords. Pushing thereafter search button 2211, search can be narrowed. After narrowing search and for wishing to see the graph of topic words for the narrowed result, button for display of topic words 2212 is pushed, satisfactorily. If search and graphic representation of topic words are continuously conducted, then, only pushing of button for search+display of topic words 2213 is satisfactory for effecting continuously the aforementioned steps.

If "information retrieval" does not draw any attention or if the documents regarding "information retrieval" are already checked and topics other than the word draw attention, negative keywords are utilized. If "retrieval" and "information retrieval" have been added to positive keywords, these words are transferred from positive keywords to negative keywords by pointing these words displayed on the area of positive keywords 2222 by mouse and pushing move button 22232 toward negative keywords. When intending to directly use a word displayed on the area for displaying topic words 224, the subject word is clicked with a mouse and the like to push the move button 22232 toward negative keywords in the same manner as for positive keywords. That is, in this example, the move button conducts transfer procedure between retrieval keywords and copying procedure from displayed topic words to keywords.

When search is practiced after transferring "retrieval" and "information retrieval" to negative keywords, the score of a document including these words is reduced while the score of a document without these contained become relatively high. Accordingly, a document with no relation to "information retrieval" can be focused, among documents relating to "electronic publishing".

Figure 19:
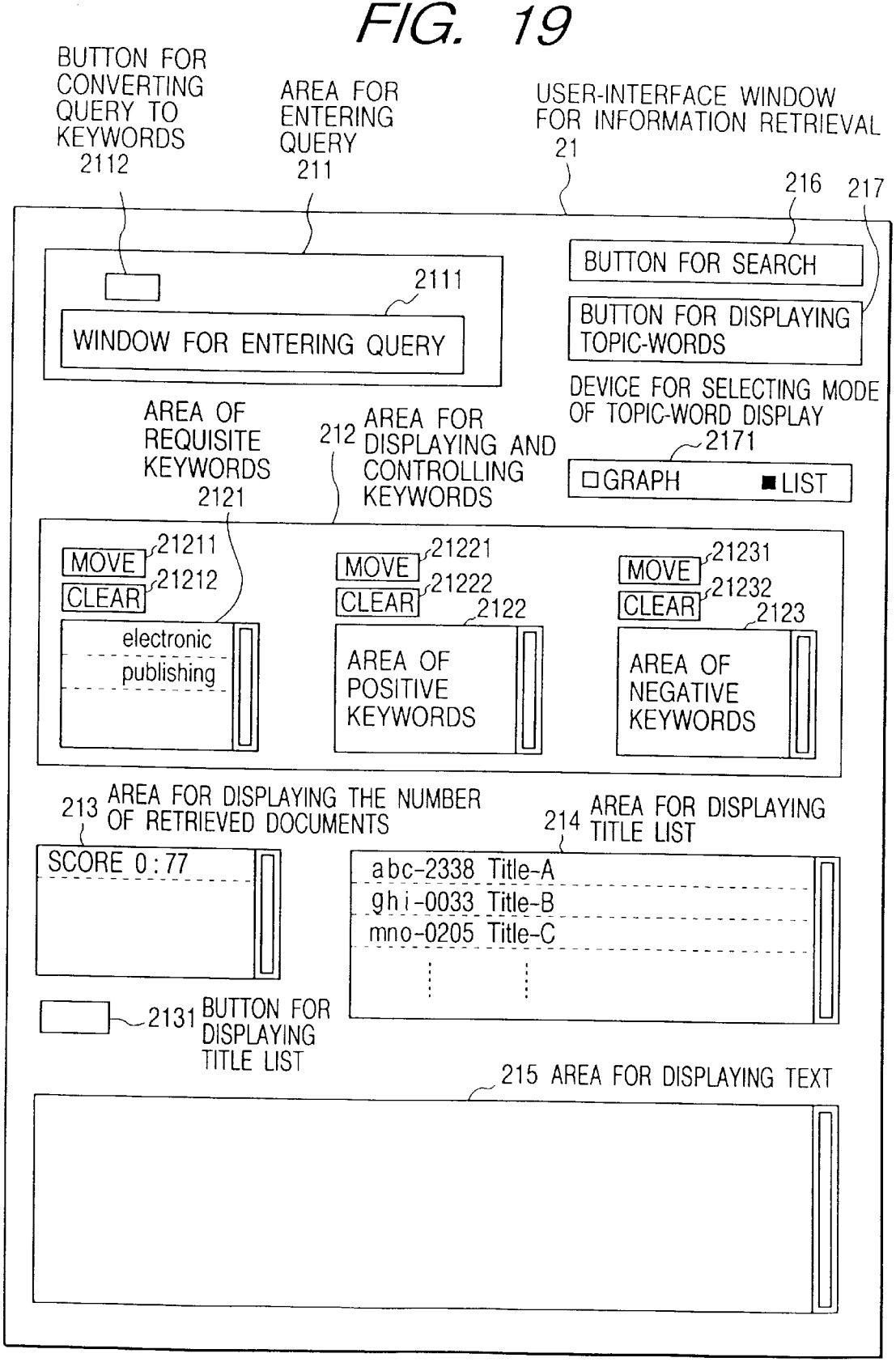
FIG. 19 is a view depicting one example of the display image of the user-interface window for information retrieval, being equipped with a means for selecting a topic word display mode.

FIG. 19 depicts one example of user-interface window for information retrieval 21 equipped with means for selecting topic word display mode 2171, having a function capable of displaying topic words in the form of a graph or in the form of a list. Compared with display in the form of a graph, the display in the form of a list can display more topic words, and therefore, the display cannot display the relation between topic words. Thus, the results with attention focused on the relation among topic words cannot be assessed, disadvantageously, but using a scroll bar, a great number of topic words appearing in the retrieval results can be listed, advantageously for a user to have a higher possibility to find a related word satisfying the interest of the user.

Thus, selecting the graphical display mode by the means for selecting topic word display mode 2171 shown in FIG. 19, firstly, the search results are graphically shown to propose the overall view of the whole image of topic words, including the individual relations, and the results are assessed. When related words satisfying the interest of a user never sufficiently appear in the results, list display is used for further detailed search. Thus, the results can be assessed at two stages. Furthermore, when an interesting word is recovered from the display utilizing list, the word can be used as a keyword to again start retrieval and repeat the same procedure.

If graphic mode is selected by the means for selecting topic word display mode 2171 in FIG. 19, graphic display of topic words can be attained as explained in FIG. 8 or 18. If list mode is selected as shown in FIG. 19, topic words can be displayed in the form of a list on the area for displaying topic words 224, as shown in one example in FIG. 20. Even if list is selected by the means for selecting topic word display mode 2171, the method for extracting topic words from the retrieved document group is the same as in the case of graphic display as described above. For list display, the frequency ranked in about 3 classes, namely high, middle and low classes, is rather more viewable than the frequency ranked in about 5 classes as shown in FIG. 9, and therefore, the number of divided frequency classes is 3 in the display example of FIG. 20.

In FIG. 20, corresponding to the selection of list, the scroll-bar-equipped display frames of area for displaying high-frequency topic words 2241, area for displaying middle-frequency topic words 2242 and area for displaying low-frequency topic words 2243 are set on the area for displaying topic words 224, and topic words corresponding to the frequency class data of the topic words in the area for storing frequency data 523 are displayed in the individual display frames. The order of display in each of the individual display frames is for example the decreasing order of the frequency ratio, whereby a user can visually look more general topic words than specific topic words such as name and places. Thus, the user can search words satisfying the interest from a wide variety of selective subjects.

EMBODIMENT II

The embodiment II of the present invention will be described below with reference to FIG. 21. The present embodiment relates to a search method, capable of satisfying retrieval requirement from a plurality of users, while the embodiment I is a composition example of a retrieval system comprising computers for independent use.

Figure 21A:
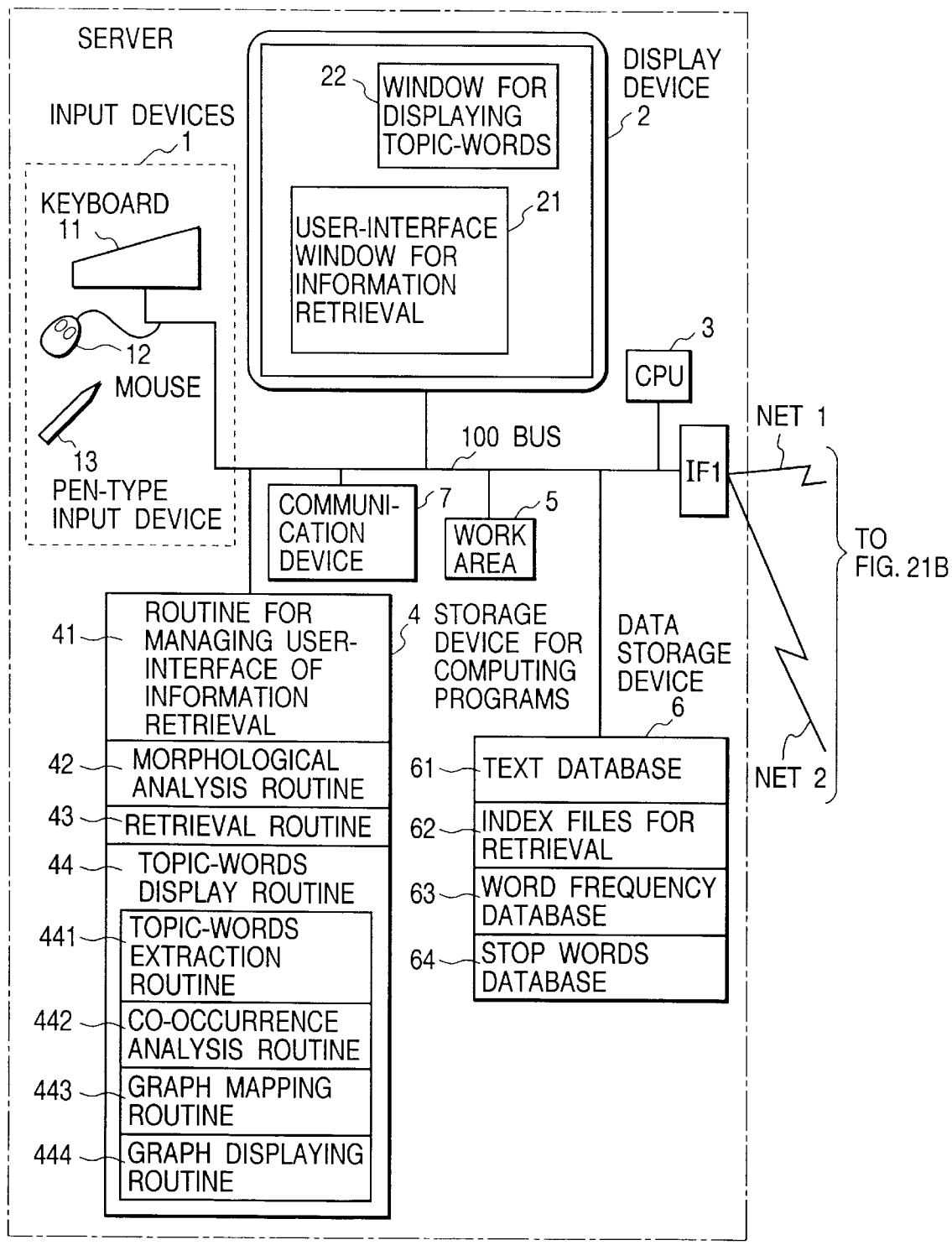
FIG. 21A is a block diagram representing the composition example of the side of a server.
Figure 21B:
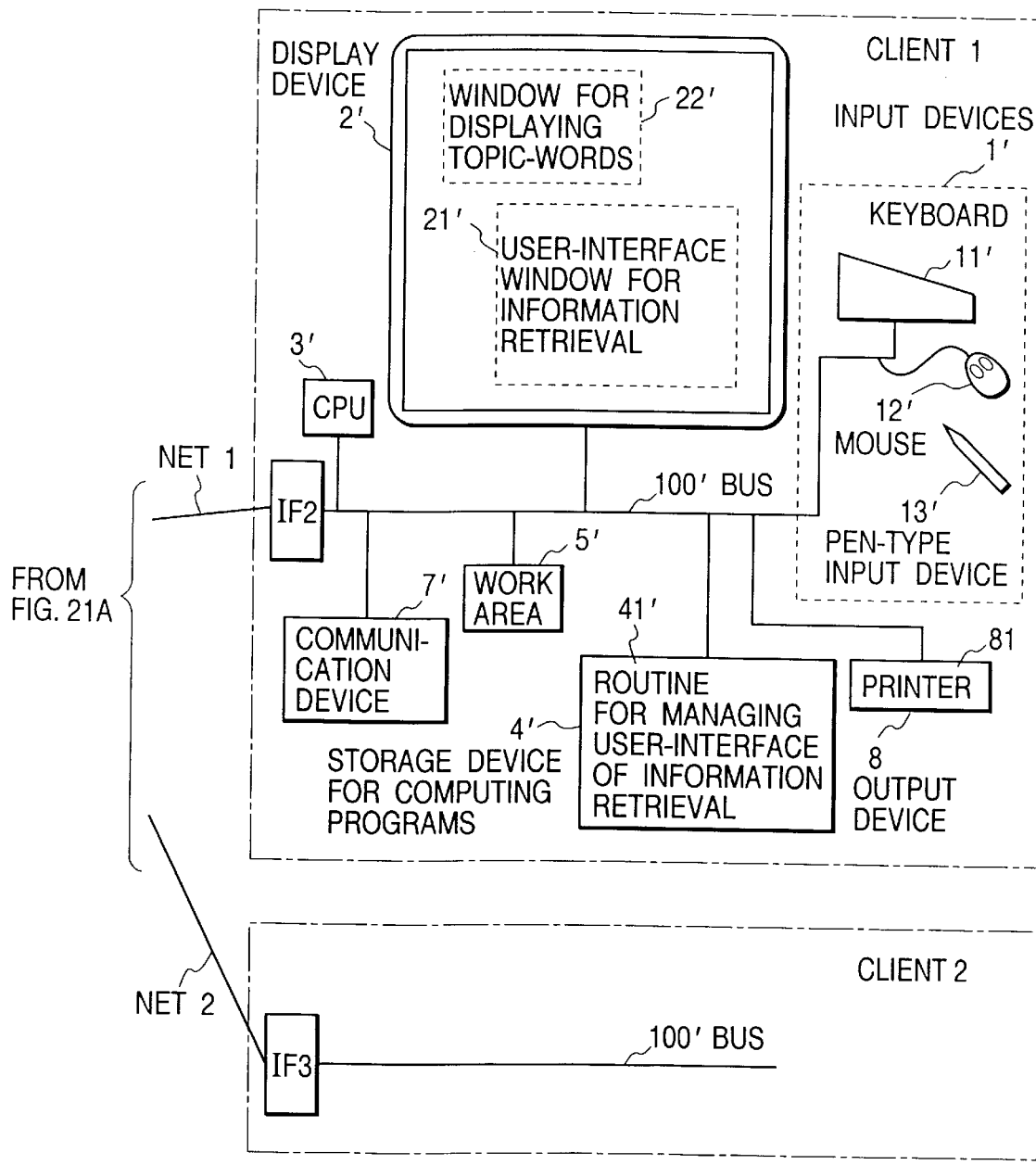
FIG. 21B is a block diagram representing the composition example of the side of a client, in a case such that the principal body of a retrieval system is provided to the side of a server and a plurality of clients make access to the system for carrying out retrieval.

FIG. 21 shows an overall structure of another embodiment realizing the document retrieval method of the present invention. In the present embodiment, a plurality of clients make access through signal transmission lines to a server, and search service can be provided to each client. Generally, such server does not use the method of itself as one client. However, in this embodiment, the server is a retrieval system of substantially the same structure as described in the embodiment I, plus communication means 7, taking into account that the server can also need to utilize the method as a client, in response to the remark of problems from the side of clients. Client is composed of dashed means individually corresponding to the input means 1, display means 2, CPU 3, storage device for computing programs 4, work area 5 for operating the computer program and bus 100, among the compositions described in the embodiment I, and additionally composed of communication means 7' to make communication with server and printer 81 as output means 8. On the bus 100 of server is arranged interface IF1; on the bus 100' of client are arranged interface IF2 and IF3, and they are in communication through lines NET1 and NET2 which connect between the server and the client. As to the client 2, herein, only bus 100' and interface IF2 are depicted, while others are omitted.

When client 1 intends to start document retrieval, firstly, the command to start document retrieval system is input from keyboard 11' as the input means 1'. Correspondingly, the communication means 7' on the side of client is connected to the communication means 7 on the side of server through communication route NET1; The routine for managing user-interface of information retrieval 41 of the storage device for computing programs 4 on the side of server is transmitted to the side of client 1, which is started on the side of the client 1. Consequently, user-interface window for information retrieval 21' to progress interactive retrieval operation is displayed on the display device 2'. After displaying of the user-interface window for information retrieval 21', the client 1 utilizes this image to input a word functioning as a retrieval key by the same procedures as described in the embodiment I. Additionally, while retaining a copy of the routine for managing user-interface of information retrieval 41 on the storage device for computing programs 4', the client can start the copied routine, satisfactorily.

It is convenient to receive the present search assisting service by utilizing hyper text access interface such as WWW browser. In this case, on the side of server is prepared hyper text (HT) for transmitting the routine for managing user-interface of information retrieval 41 to the side of client. Furthermore, it is a preliminary provision that the side of client is in environment such that common hyper text access interfaces can be utilized.

From the address input area of the hyper text access interface displayed on the display device 2', assigning the address defined by the present search assisting service (namely, the address of the server on the net work and the file name in which the hyper text HT to transmit the routine for managing user-interface of information retrieval 41 is present), the hyper text HT is transmitted to the side of client through the binary communication means, along with the routine for managing user-interface of information retrieval 41, and the transmitted routine for managing user-interface of information retrieval 41 is started by the computer on the side of client, which displays the user-interface window for information retrieval 21' on the display device 2' for use.

The address of the hyper text HT is designated directly above, but when the address of the present hyper text HT is embedded as an anchor in the hyper text displayed on the access device of the hyper text access interface, the anchor part is clicked by mouse and the like, whereby the same operation can be run.

The retrieval requirement input by the client 1 is transmitted through the communication means 7, 7' and communication route NET1, to the side of server, and the side of server practices necessary retrieval, topic word extraction and computation of graphic mapping, and the results are again transmitted back to the side of the client 1 through the contact with communication means 7, 7', which is then handed to the routine for managing user-interface of information retrieval 41' of the client 1, where the routine displays the topic word graph based on the data on the area for displaying topic words 22'. As described in the embodiment I, on the basis of the retrieval results, the client 1 further inputs a data corresponding to further required retrieval procedures. The data is then transmitted again to the side of server, where necessary retrieval is practiced to display the results on the area for displaying topic words 22'. The client 1 can utilize a print-out output, printed by printer 81, if necessary.

The client 1 can utilize only the results practiced on the side of server, with no waiting of substantial retrieval program. Thus, on the side of the client 1, work area 5' requires only a capacity to retain the initial input data and the retrieval results transmitted from server and the topic words and the data relating to the graphic arrangement, and thus, very rich retrieval service can be proposed on a simple system.

What is claimed is:

1. A method for assisting document retrieval, comprising,
    detecting documents each including one or a plurality of keywords corresponding to a query as documents of retrieval results from a retrieval subject document group,
    detecting the document frequency of a word, representing the number of documents where the word appears in the group of the documents of retrieval results,
    detecting the total document frequency of a word representing the number of documents where the word appears in the whole retrieval subject document group,
    introducing a frequency ratio representing the ratio of the document frequency of a word to the total document frequency of the word,
    classifying the document frequency in a set of frequency classes as based on a given relation and assigning each word to a corresponding frequency class, depending on the document frequency of the word,
    extracting an appropriate number of words from each of the frequency classes in the decreasing order of frequency ratio of word as topic words, and
    displaying the extracted topic words in the form of a graph or a list.

2. A method for assisting document retrieval, according to claim 1, wherein the extracted topic words are displayed in the form of a list per frequency class or the form of a graph representing the relation between topic words.

3. A method for document retrieval service, comprising,
    detecting documents each including a keyword transmitted from a retriever as documents of retrieval results from a retrieval subject document group,
    detecting the document frequency of a word, representing the number of documents where the word appears in the group of documents as retrieval results,
    detecting the total document frequency of a word representing the number of documents where the word appears in the whole retrieval subject document group,
    introducing a frequency ratio representing the ratio of the document frequency of a word to the total document frequency of the word,
    classifying the document frequency in a set of frequency classes based on a given relation and assigning each word to a corresponding frequency class, depending on the document frequency of the word,
    extracting an appropriate number of words from each of the frequency classes in the decreasing order of frequency ratio of word as topic words,
    composing the extracted topic words as a data displayable in the form of a list per frequency class or in the form of a graph representing the relation between topic words, and
    transmitting the topic words and said composed data for displaying to the retriever.

4. A method for document retrieval service, according to claim 3, wherein the retriever is equipped with a means for transmitting keywords for retrieval to the retrieval system, and receiving the composed data concerning topic words transmitted from the retrieval system, and displaying the topic words according to the transmitted composed data, so as to receive retrieval service.

5. A method for document retrieval service, according to claim 4, wherein the retriever receives, from a document retrieval service system before acting document retrieval for transmitting keywords for retrieval to the retrieval service system, and receiving the composed data concerning topic words transmitted from the retrieval service system, and displaying the topic words according to the transmitted composed data.

6. A machine readable data storing media on which the word frequency data for selecting topic words are recorded, wherein the frequency data of each word comprises (a) character sequence, (b) the document frequency of the word, representing the number of documents where the word appears in the group of documents of retrieved results, (c) the total document frequency of the word representing the number of documents where the word appears in the whole retrieval subject document group, (d) the frequency ratio representing the ratio of the document frequency of the word to the total document frequency of the word, and (e) the frequency class of the word assigned to the word depending on its document frequency, and wherein topic words are extracted from each of the frequency classes in the decreasing order of frequency ratio of word.

7. A machine readable data storing media on which the co-occurrence data for calculating the relatedness among topic words are recorded, wherein the co-occurrence data of each pair of topic words comprises (a) the co-occurrence frequency of the word pair, that is, the number of documents in the retrieved document set where both words of the word pair appear, and (b) the co-occurrence intensity of the word pair, such as their co-occurrence frequency divided by document frequency of the second word of the word pair, and wherein the links of the graphical display of topic words are generated for word pairs with strong relation.

8. A machine readable data storing media on which the coordinate data for displaying a graphical display of topic words are recorded, wherein the data comprises data for displaying nodes of the topic word graph and data for displaying links of the graph representing strong relation between topic words, and the data for displaying nodes comprises the coordinate center, character sequence, and the character number in the crosswise and lengthwise directions of a region displaying the characters, and the size of the displaying region, and the data for displaying links comprises the initiation coordinate and the termination coordinate of each link, and wherein the graphic display of a word graph are displayed following the data.

9. A machine readable data storing media on which are recorded the data of each word for selecting topic words, data of each pair of topic words for calculating the relatedness among topic words, and data of each topic word for displaying a graphical display of topic words, wherein the data of each word comprises (a) character sequence, (b) the document frequency of the word, representing the number of documents where the word appears in the group of documents of retrieved results, (c) the total document frequency of the word representing the number of documents where the word appears in the whole retrieval subject document group, (d) the frequency ratio representing the ratio of the document frequency of the word to the total document frequency of the word, and (e) the frequency class of the word assigned to the word depending on its document frequency, and topic words are extracted from each of the frequency classes in the decreasing order of frequency ratio of word, wherein the co-occurrence data of each pair of topic words comprises(a) the co-occurrence frequency of the word pair, that is, the number of documents in the retrieved document set where both words of the word pair appear, and (b) the co-occurrence intensity of the word pair, such as their co-occurrence frequency divided by document frequency of the second word of the word pair, and the links of the graphical display of topic words are generated for word pairs with strong relation, wherein the data comprises data for displaying nodes of the topic word graph and data for displaying links of the graph representing strong relation between topic words, and the data for displaying nodes comprises the coordinate center, character sequence, and the character number in the crosswise and lengthwise directions of a region displaying the characters, and the size of the displaying region, and the data for displaying links comprises the initiation coordinate and the termination coordinate of each link, and the graphic display of a word graph can be displayed following the data.

10. A document retrieval system comprising
    a means for detecting documents each including one or a plurality of keywords corresponding to a query as documents of retrieval results from a retrieval subject document group,
    a means for detecting the document frequency of a word, representing the number of documents where the word appears in the group of the documents of retrieval results,
    a means for detecting the total document frequency of a word representing the number of documents where the word appears in the whole retrieval subject document group,
    a means for introducing a frequency ratio representing the ratio of the document frequency of a word to the total document frequency of the word,
    a means for classifying the document frequency in a set of frequency classes as based on a given relation and assigning each word to a corresponding frequency class, depending on the document frequency of the word,
    a means for extracting an appropriate number of words from each of the frequency classes in the decreasing order of frequency ratio of word as topic words, and
    a means for displaying the extracted topic words in the form of a graph or a list.

11. A document retrieval system, according to claim 10, wherein said display means displays the extracted topic words in the form of a list per frequency class or in the form of a graph representing the relation between topic words and said retrieval system includes means for selecting the display form.

12. A document retrieval system, according to claim 11, wherein the query comprises three types of keywords of requisite keyword, positive keyword and negative keyword, and the retrieval by requisite keyword is carried out under AND conditions with each requisite keyword, and wherein individual documents in the group of documents as retrieval results can be given a higher score depending on the number of positive keywords if the documents include the positive keywords or are reduced of their scores depending on the number of negative keywords if the documents include the negative keywords, to extract topic words from a document group with a higher score given.

13. A document retrieval system, according to claim 12, wherein the type of a keyword can be changed among three types of keywords, namely the one or a plurality of keywords of the query, positive keywords and negative keywords, and the topic words displayed can be copied as any of these three types of keywords.

14. A document retrieval system, according to claim 12, wherein retrieval with positive keywords is run if no requisite keyword is set and retrieval with each positive keyword is run under OR conditions.

15. A document retrieval system, according to claim 14, wherein the type of a keyword can be changed among three types of keywords, namely the one or a plurality of keywords of the query, positive keywords and negative keywords, and the topic words displayed can be copied as any of these three types of keywords.

16. A document retrieval system, according to claim 11, wherein the relation between topic words is determined on the basis of the co-occurrence relation between the topic words, and wherein the form of a graph is a graph composed by linking together a word pair of topic words with higher relation, using topic words as nodes.

17. A document retrieval system, according to claim 16, wherein the direction of the longitudinal axis in the graphic representation of topic words represents the document frequency of a topic word in the retrieved document group.

18. A document retrieval system, according to claim 11, wherein the direction of the longitudinal axis in the graphic representation of topic words represents the document frequency of a topic word in the retrieved document group.

19. A document retrieval system, according to claim 3, wherein the relation between topic words is determined on the basis of the co-occurrence relation between the topic words, and wherein the form of a graph is a graph composed by linking together a word pair of topic words with higher relation, using topic words as nodes.

20. A document retrieval system, according to claim 19, wherein the direction of the longitudinal axis in the graphic representation of topic words represents the document frequency of a topic word in the retrieved document group.

21. A document retrieval system, according to claim 10, wherein the query comprises three types of keywords of requisite keyword, positive keyword and negative keyword, and the retrieval by requisite keyword is carried out under AND conditions with each requisite keyword, and wherein individual documents in the group of documents as retrieval results can be given a higher score depending on the number of positive keywords if the documents include the positive keywords or are reduced of their scores depending on the number of negative keywords if the documents include the negative keywords, to extract topic words from a document group with a higher score given.

22. A document retrieval system, according to claim 21, wherein the type of a keyword can be changed among three types of keywords, namely the one or a plurality of keywords of the query, positive keywords and negative keywords, and the topic words displayed can be copied as any of these three types of keywords.

23. A document retrieval system, according to claim 21, wherein retrieval with positive keywords is run if no requisite keyword is set and retrieval with each positive keyword is run under OR conditions.

24. A document retrieval system, according to claim 23, wherein the type of a keyword can be changed among three types of keywords, namely the one or a plurality of keywords of the query, positive keywords and negative keywords, and the topic words displayed can be copied as any of these three types of keywords.

* * * * *